(12) United States Patent
Katta et al.

(10) Patent No.: US 6,971,022 B1
(45) Date of Patent: Nov. 29, 2005

(54) CRYPTOGRAPHIC APPARATUS FOR PERFORMING CRYPTOGRAPHY ON A SPECIFIED AREA OF CONTENT DATA

(75) Inventors: Noboru Katta, Itami (JP); Susumu Ibaraki, Toyonaka (JP); Shinji Inoue, Neyagawa (JP); Makoto Tatebayashi, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 909 days.

(21) Appl. No.: 09/593,677

(22) Filed: Jun. 14, 2000

(30) Foreign Application Priority Data

| Jun. 15, 1999 | (JP) | ................................. 11-167898 |
| Jun. 15, 1999 | (JP) | ................................. 11-167899 |

(51) Int. Cl.[7] ........................ G06F 11/30; G06F 12/14; H04L 9/32; H04L 9/00; H04K 1/04
(52) U.S. Cl. ........................ 713/193; 713/165; 380/37; 711/163
(58) Field of Search ............................... 711/163, 164; 713/193, 165; 380/212, 214, 217, 263, 37, 380/204

(56) References Cited

U.S. PATENT DOCUMENTS

| 5,261,003 A | * | 11/1993 | Matsui ........................ 380/264 |
| 5,475,757 A | * | 12/1995 | Kelly ........................... 713/159 |
| 5,546,461 A | * | 8/1996 | Ibaraki et al. ................ 380/217 |
| 5,548,648 A | | 8/1996 | Yorke-Smith |
| 5,875,349 A | * | 2/1999 | Cornaby et al. ................ 710/5 |
| 6,052,780 A | * | 4/2000 | Glover ........................ 713/193 |
| 6,314,409 B2 | * | 11/2001 | Schneck et al. ............. 713/193 |
| 6,490,353 B1 | * | 12/2002 | Tan .............................. 380/37 |
| 6,550,009 B1 | * | 4/2003 | Uranaka et al. ............ 713/168 |

FOREIGN PATENT DOCUMENTS

| JP | 10055135 | 2/1998 |
| JP | 11215122 | 8/1999 |

OTHER PUBLICATIONS

Sholander et al. "The Effect of Algorithm-Agile Encryption on ATM Quality of Service", 1997 IEEE.*
Dictionary.com. Definition of "match", May 2005.*

* cited by examiner

*Primary Examiner*—Andrew Caldwell
*Assistant Examiner*—Michael J. Simitoski

(57) ABSTRACT

A cryptographic apparatus reads, from a portable storage medium, content data and cryptographic information specifying a certain part of the content data on which cryptographic processing is to be performed, specifies the certain part in the read content data based on the read cryptographic information, and performs one of encryption and decryption on the certain part. When, for example, the content data is formed from alternating headers and variable-length data sections, the cryptographic information is a program formed from an instruction sequence. The instruction sequence has the cryptographic apparatus detect a header in the content data, read the length of the variable-length data, and perform cryptographic processing on a part of the content data between a start point and an end point, the start point being a position relative to the header position, and the end point being a value resulting from adding the length to the start point.

31 Claims, 31 Drawing Sheets

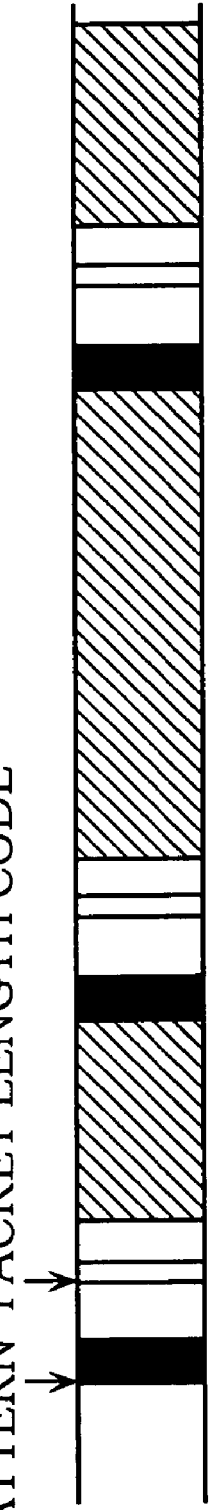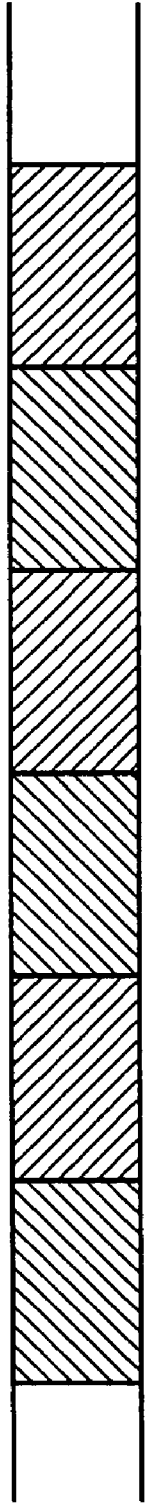
fig. 1A  SYNC PATTERN
fig. 1B  SYNC PATTERN PACKET LENGTH CODE
fig. 1C

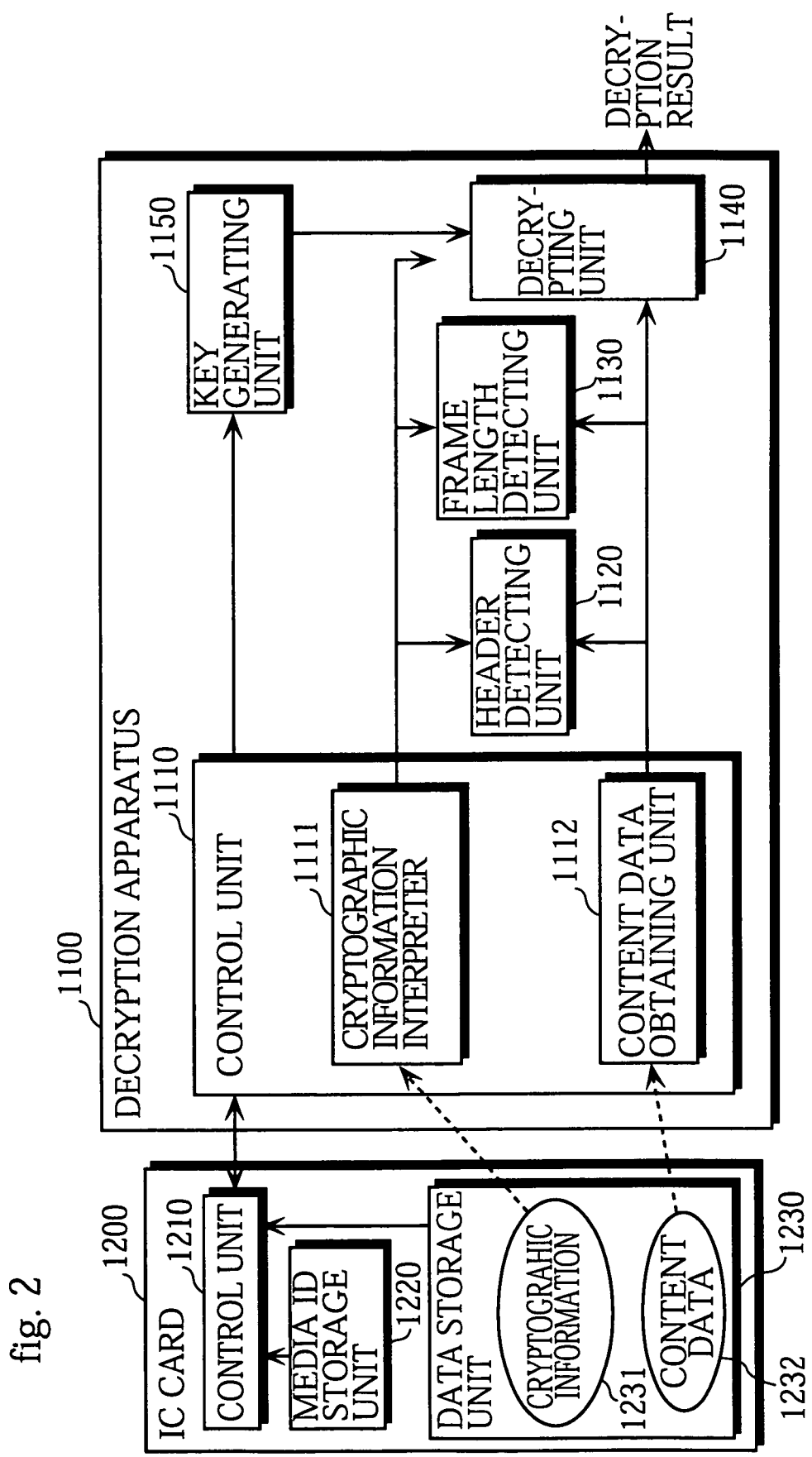

fig. 3

| | |
|---|---|
| HEADER DETECTING FUNCTION | head_detect(detect_pattern_size,detect_pattern,pnt_offset)<br>detect_pattern_size:PATTERN BIT SIZE OF HEADER TO BE DETECTED<br>detect_pattern:BIT PATTERN OF HEADER TO BE DETECTED<br>pnt_offset:START POINT OF DETECTION |
| FRAME LENGTH DETECTING FUNCTION | framelength_detect(length_code_position,lengthcode_length,unit)<br>lengthcode_position:A POINT THE NUMBER OF BITS SHOWN IN FRAME LENGTH CODE FROM HEADER DETECTING POINT<br>lengthcode_length:LENGTH OF FRAME LENGTH CODE<br>unit:BASIC UNIT OF VALUE SHOWING FRAME LENGTH CODE. IF BITS=1, IF BYTES=8 |
| REFERENCE POINT MOVING FUNCTION | reference_point_move(move_no)<br>move_no:NUMBER OF BITS TO BE MOVED |
| DECRYPTING FUNCTION | decryption(algorithm_no,mode,blocklength,end_pnt)<br>algorithm_no:ALGORITHM NUMBER(1=DES, 2=FEAL ETC)<br>mode:APPROPRIATE MODE(1=FCB, 2=OFB, 3=CBC)<br>blocklength:PROCESSING BLOCK LENGTH<br>end_pnt:PROCESSING END POINT | fig. 4

```
ref_pnt=0;
while(endofdata)
{
            pnt_offset=ref_pnt;
            ref_pnt=head_detect(12,0xfff,ref_pnt);
            frame_length=frame_length_detect(31,13,8);
            ref_pnt=reference_point_move(13);
            end_pnt=pnt_offset+framelength;
            decryption(1,3,64,end_pnt);
            ref_pnt=end_pnt;
}
end
``` fig. 10

| FILE TYPE (EXTENSION) ~1541 | CRYPTOGRAPHIC INFORMATION ~1542 |
|---|---|
| A | TYPE A CRYPTOGRAPHIC INFORMATION |
| B | TYPE B CRYPTOGRAPHIC INFORMATION |
| | | fig. 17

| |
|---|
| SYNC DETECTING INSTRUCTION<br>Sync_detect ⟨END POINT⟩ ⟨REFERENCE ADDRESS⟩ ⟨SYNC DESCRIPTOR INFORMATION⟩ |
| SYNC VERIFYING INSTRUCTION<br>Sync_check ⟨END POINT⟩ ⟨REFERENCE ADDRESS⟩ ⟨SYNC DESCRIPTOR INFORMATION⟩ |
| AREA DETECTING INSTRUCTION<br>Area_detect ⟨POINT⟩ ⟨AREA DESCRIPTOR INFORMATION⟩ |
| CRYPTOGRAPHIC PROCESSING INSTRUCTION<br>Encrypt ⟨CRYPTOGRAPHY START POINT⟩ ⟨CRYPTOGRAPHY END POINT⟩<br>⟨CRYPTOGRAPHIC DESCRIPTOR INFORMATION⟩ | fig. 19

AREA DESCRIPTOR INFORMATION

| bits | 31 | 30 29 28 27 26 25 24 | 23 22 21 20 19 | 18 17 16 | 15 14 13 12 11 10 9 8 7 6 5 4 3 2 1 0 |
|---|---|---|---|---|---|
| n | as | flag_wide / reserved | flag_pattern1 | flag_pattern2 | flag_pnt |
| n+1 | | | | | offset |
| n+2 | | length_wide | length_type | length_unit / reserved | length_pnt |

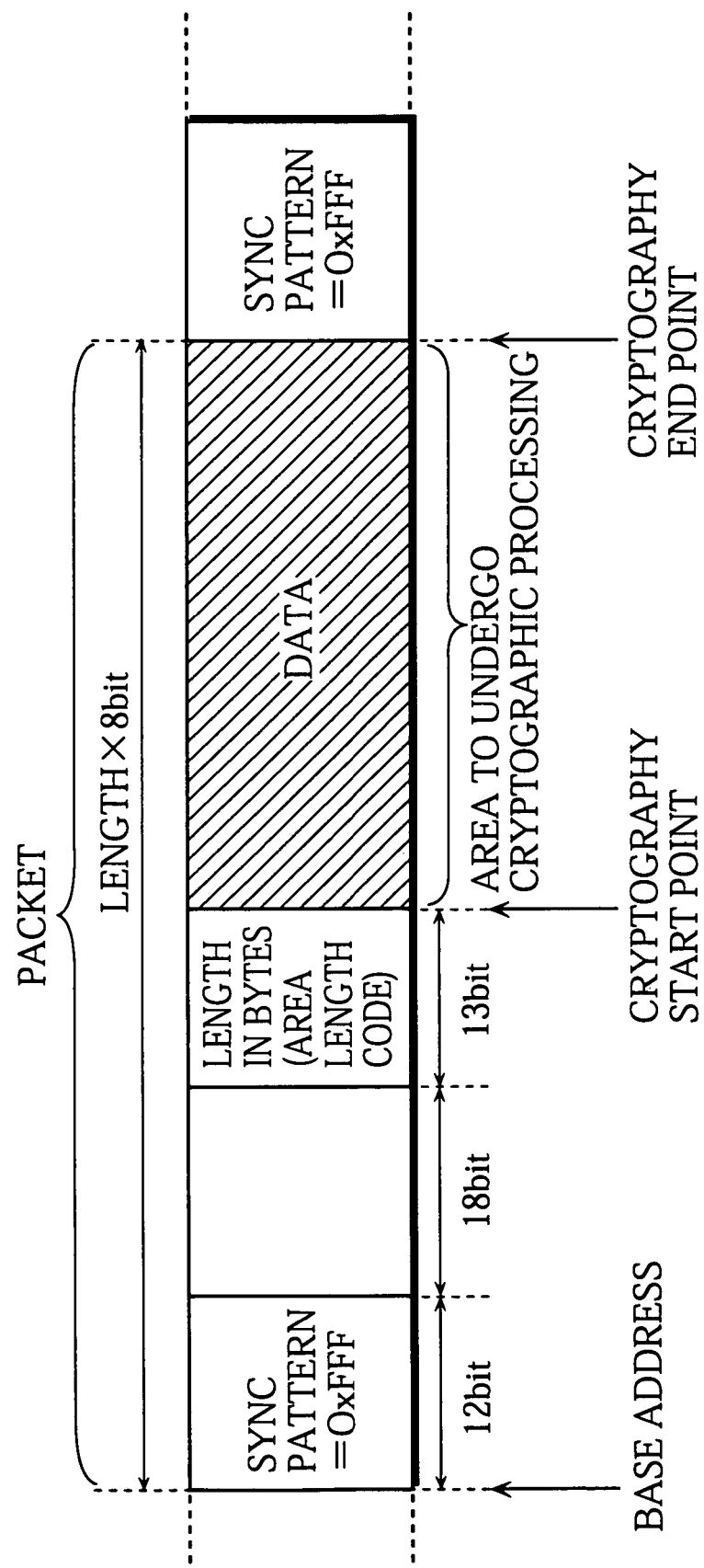

fig. 31

```
901 ―― LABEL1:
902 ―― Sync_detect #2 #1  〈SYNC DESCRIPTOR INFORMATION:sync_wide=12,sync_pattern=0xFFF〉
903 ―― Area_detect #2    〈AREA DESCRIPTOR INFORMATION:as=1,length_pnt=31,length_wide=13,length_unit=3,le
                         ngth_type=UNSIGNED,MOST SIGNIFICANT BIT FIRST〉
904 ―― Sync_check #2 #1  〈SYNC DESCRIPTOR INFORMATION:sync_wide=12,sync_pattern=0xFFF〉
905 ―― JNZ LABEL1
906 ―― Area_detect #3    〈AREA DESCRIPTOR INFORMATION:offset=43〉
907 ―― Area_detect #4    〈AREA DESCRIPTOR INFORMATION:as=1,length_pnt=31,length_wide=13,length_unit=3,le
                         ngth_type=UNSIGNED,MOST SIGNIFICANT BIT FIRST〉
908 ―― Encrypt #3 #4     〈CRYPTOGRAPHY DESCRIPTOR INFORMATION:Cipher_algorithm[0]=DES,Cipher_mode[0]=CBC,Cipher_b
                         lock[0]=8,no=1,bd[1]=1,Boundary[1]=8,Cipher_algorithm[1]=DES,Cipher_mode[1]=OFB,C
                         ipher_block[1]=8〉
909 ―― JMP LABEL1
```

CRYPTOGRAPHIC APPARATUS FOR PERFORMING CRYPTOGRAPHY ON A SPECIFIED AREA OF CONTENT DATA

BACKGROUND OF THE INVENTION

This application is based on applications No. 11-167899 and 11-167898 filed in Japan, the content of which is hereby incorporated by reference.

1. Field of the Invention

The present invention relates to cryptographic technology and in particular to a cryptographic apparatus for performing cryptography (cryptographic processing) on a specified area of data that has been transmitted, or recorded on a recording medium. Here, cryptography is a concept including both encryption and decryption, and a cryptographic apparatus is a concept encompassing both an encryption apparatus and a decryption apparatus.

2. Description of the Prior Art

Cryptography, or the art of securing data in a secret form, has come to be used increasingly in recent years to protect digital audio and video signals and the like (hereafter referred to as content data) from illegal use.

Content data containing audio, video and the like is encrypted before being transmitted or recorded onto a recording medium. This means that such data can only be used by an authorized user.

The content data may be organized in various ways, i.e in a variety of formats, which are determined by the access requirements of a particular piece of data, or other reasons. Examples of data format types are MPEG (Motion Picture Expert Group) 1 video, and Layer 1, Layer 2, and Layer 3 audio (known as MP3); MPEG2 video, AAC (Advanced Audio Coding) audio, and system streams such as TS (Transport Stream) and PS (Program Stream); MPEG4 video, audio such as AAC and TwinVQ (Transform-domain Weighted Interleave Vector Quantization) and system streams; as well as Dolby-AC3 audio and audio and video in DV format. The content data may also be in a transmission format or in one of the various formats used to record data onto CD-ROM, DVD-ROM, IC cards and the like.

When the content data is in such a format, it may be necessary to perform cryptography only on certain sections of the content data. For example, in digital broadcasting, program data for a pay-per-view program is transmitted in broadcast units known as packets. The payload section of each packet, but not the header, is encrypted. A digital broadcast receiving apparatus receives the packets for the broadcast program and decrypts the encrypted sections only, thereby enabling the pay-per-view program to be viewed.

Various encryption algorithms are used in such encryption and decryption. These include the RSA (Rivest, Shamir Adleman) encryption algorithm, the DES (Data Encryption Standard) encryption algorithm and the FEAL (Fast Data Encipherment Algorithm) encryption algorithm. The DES encryption algorithm can be further divided into a plurality of algorithms in modes such as ECB (electronic codebook) mode, OFB (output feedback) mode and CBC (cipher block chaining) mode, which differ according to the application of the basic algorithm.

The following is an explanation of an example showing how cryptography is performed on content data.

FIGS. 1A to 1C show methods of performing cryptography on content data.

In FIG. 1A, content data is formed from packets of a fixed length and the sections on which cryptography is to be performed are shaded diagonally. A conventional cryptographic apparatus performing cryptography on content data with fixed- length packets detects a preset sync pattern, shown by the black areas in FIG. 1A, and performs cryptography on a section of a preset length starting from, but not including, the preset sync pattern.

In FIG. 1B, content data is formed from variable-length packets, and the sections on which cryptography is to be performed are shaded diagonally. A conventional cryptographic apparatus performing cryptography on content data with variable-length packets detects a preset sync pattern, shown by the black areas in FIG. 1B, detects the length of the packet by extracting a packet length code positioned a preset distance away from the sync pattern, and performs cryptography on a section having a length determined based on the packet length.

FIG. 1C shows a situation in which cryptography is repeatedly performed for a constant period on content data. A conventional cryptographic apparatus performing repeated cryptography in a constant cycle on content data performs cryptography on sections of a same length, shown by the contrasting shaded lines in FIG. 1C, using a preset encryption algorithm.

When many types of cryptography have been used, as when audio and video content data is encrypted and recorded on a recording medium, it is desirable that the content data be played back at high speed by randomly accessing an arbitrary point on the recording medium. To achieve this, encryption is implemented in a predetermined way on each basic data unit in the content data to be accessed at random, so that areas including management data for random access are not encrypted, but other areas are encrypted. The encryption algorithm used for encryption is also predetermined. The size of the basic data unit used for random access may also vary according to the type of recording medium used.

Therefore, conventional cryptographic apparatuses perform cryptography on content data according to a method in which the sections of the content data on which cryptography is to be performed and the encryption algorithm that is to be used are predetermined according to the format of the content data and other such conditions.

Conventionally, a paired encryption apparatus and decryption apparatus implement encryption and decryption according to predetermined corresponding methods. In other words, content data that has been encrypted by a conventional encryption apparatus using a fixed method is transmitted via a communications path, or conveyed recorded on a recording medium, and this transmitted or recorded content data is then decrypted by a conventional decryption apparatus using a corresponding decryption method.

This kind of conventional cryptographic apparatus has the following problems.

1. As mentioned above, content data comes in various formats, and it is likely that new transmission formats and new types of recording medium, along with content data with a new kind of data construction, will appear in the future. However, a conventional cryptographic apparatus performs cryptography according to a predetermined method, so that the content data which can be processed by such a cryptographic apparatus is limited, and it is not universally applicable.

2. Content data encrypted by an encryption apparatus using a certain method can only be decrypted using a specific decryption apparatus that has been constructed to implement decryption according to a corresponding method.

SUMMARY OF THE INVENTION

The present invention has been designed to overcome the above problems. An object of the invention is to provide a cryptographic apparatus that can perform cryptography using the appropriate method (cryptosystem) for the content data concerned, content data being in any one of all current and future permutations. Note that the appropriate cryptosystem must at least be capable of specifying an appropriate part on which cryptography is to be performed. In particular, the object here is to provide a general-purpose cryptographic apparatus for decrypting content data encrypted using an arbitrary method, and a cryptographic apparatus for encrypting that creates information to be given to the general-purpose cryptographic apparatus used for decryption, thereby ensuring that decryption is implemented using the appropriate method. A further object of the invention is to provide a cryptographic method to be used by the above apparatuses, a program recording medium recording a control program for realizing these cryptographic apparatuses in a computer, and a data recording medium recording information to be given to the cryptographic apparatuses to ensure that cryptography is performed using the appropriate cryptosystem.

In order to achieve the above objects, the cryptographic apparatus of the present invention includes the following. A data reading unit reads content data and cryptographic information from a portable storage medium. Here, the cryptographic information includes information used to specify a certain part of the content data on which cryptographic processing is to be performed. A part specifying unit specifies the certain part of the read content data, based on the read cryptographic information. A cryptographic processing unit then performs one of encryption and decryption on the certain part of the read content data.

Using this construction, the cryptographic apparatus can accurately specify a part of the content data stored on the storage medium on which cryptographic processing is to be performed, and perform cryptographic processing on this part. This means that there is no need to store in advance in the cryptographic apparatus information for specifying the part of the content data on which cryptographic processing is to be performed, and the cryptographic apparatus can be a general-purpose device performing cryptographic processing on content data in a variety of formats.

Furthermore, a plurality of pieces of content data are each recorded as a file on the storage medium, along with cryptographic information for each of a plurality of file types. Here the data reading unit reads the content data of a file and the cryptographic information for a corresponding file type from the storage medium.

Using this construction, a part of the content data on which cryptographic processing is to be performed can be accurately specified and cryptographic processing performed, even if the part to be processed in content data contained in a file varies depending on file type, in other words on the format of the file.

Furthermore, the cryptographic information includes a reference instruction indicating that a data section in the content data be referred to. Here, the part specifying unit specifies the certain part by referring to the data section as indicated by the reference instruction.

Using this construction, a part of the content data on which cryptographic processing is to be performed can be accurately specified and cryptographic processing performed, even if the part to be processed is variable-length data not specified by fixed point information or similar, but can only be specified by referring to data in the content data such as a code showing the length of a variable-length part.

Furthermore, the cryptographic information includes bit pattern information showing a certain bit sequence. Here, the part specifying unit detects, in the content data, bit data that matches the bit sequence shown in the bit pattern information. Then it uses a location of the bit data as a basis for specifying the certain part, the certain part having a fixed positional relationship to the bit data.

Using this construction, the part on which cryptographic processing is to be performed can be specified even if content data has a data structure formed from repeated header and payload sections, the latter being the part to be processed.

Furthermore, the indicated data section shows a length of the certain part. Here, the part specifying unit specifies the certain part of the content data by referring to the data section as indicated by the reference instruction, and calculating the length of the certain part based on the referenced data section.

Using this construction, the part on which cryptographic processing is to be performed to be specified when, for example, content data is formed from header and payload sections, the latter being of variable-length. Here, the range of the part to be processed is specified by obtaining a code showing the length of the payload section from the content data.

Furthermore, the cryptographic information includes a value showing a unit used for the indicated data section. Here, the part specifying unit specifies the certain part by multiplying the length shown by the data section with the unit value to calculate the length of the certain part.

Using this construction, the part on which cryptographic processing is to be performed can be specified when a code showing the length of the variable-length part and a code showing the unit of length are present in the content data. Here, the range of the variable-length part is specified by referring to these codes.

Furthermore, the cryptographic information includes a detect instruction for detecting, from the content data, bit data that matches the certain bit sequence shown by the bit pattern information, and determines the order in which the reference and detect instructions are performed. Here, the part specifying unit specifies the certain part in the content data by performing, in the predetermined order, operations indicated by each of the instructions.

Using this construction, the part of the content data on which cryptographic processing is to be performed can be specified by performing the operations for each instruction in the order shown by the cryptographic information. In other words, when the cryptographic information is written using program descriptors, a cryptosystem is specified and cryptographic processing performed by interpreting and executing these program descriptors one after the other.

Furthermore, the cryptographic information includes at least one piece of algorithm information for specifying an algorithm used for cryptographic processing. Here, the cryptographic processing unit performs one of encryption and decryption on the certain part using the specified algorithm.

Using this construction, the cryptographic apparatus of the present invention can specify appropriate cryptographic algorithms to be used for performing cryptographic processing on the area in the content data to be processed, and perform the cryptographic processing. As a result, there is no need for information regarding the cryptographic algorithms to be predetermined and stored in advance by the cryptographic apparatus, and the cryptographic algorithm can be a general-purpose one.

Furthermore, the cryptographic processing unit encrypts the certain part, and the cryptographic apparatus further comprises a content data recording unit for recording the encrypted content data onto the storage medium.

Using this construction, the cryptographic apparatus of the present invention can update content data on a storage medium by performing encryption according to information that relating to cryptosystems stored on the storage medium.

Furthermore, the cryptographic information includes a plurality of pieces of algorithm information, and pieces of range information each showing a range over which an algorithm is applied. Here, the cryptographic processing unit selects, for each application range in the certain part, a piece of algorithm information based on the range information, and uses an algorithm specified by the piece of algorithm information to perform one of encryption and decryption on the application range.

Using this construction, cryptographic processing can be performed on content data using a plurality of cryptographic algorithms as appropriate.

Furthermore, the cryptographic information includes information showing priority ratings indicating an order in which the pieces of algorithm information should be applied. Here, when the application ranges of a plurality of algorithms overlap, the cryptographic processing unit selects pieces of algorithm information according to the priority ratings.

Using this construction, appropriate cryptographic algorithms can be selected according to cryptographic information specified by descriptors showing the priority ratings of the plurality of cryptographic algorithms.

Furthermore, the cryptographic processing unit decrypts the certain part.

Using this construction, the cryptographic apparatus of the present invention can accurately specify a part of the content data to be decrypted, in other words, the encrypted part, and decrypt this part. A general-purpose decryption apparatus capable of decrypting content data encrypted in a variety of formats is realized, and an object of the invention can be achieved.

The cryptographic apparatus may also include the following. An encrypting information reading unit reads from another portable storage medium, encrypting information including information used to specify a certain part in the decrypted content data to be encrypted. An encryption part specifies unit for specifying a certain part to be encrypted in the decrypted content data, according to the encrypting information. An encrypting unit encrypts the part specified by the encrypting information. Then, a content data recording unit records the encrypted content data onto the other storage medium.

This construction applies when the part on which cryptographic processing is to be performed varies according to the storage medium on which the content data is stored. When encrypted content data is copied from one storage medium to another, encryption or decryption can be implemented on an appropriate part of the content data according to the type of storage medium.

A cryptographic apparatus may encrypt content data and record the encrypted data onto a storage medium. This cryptographic apparatus includes the following. A content data obtaining unit obtains content data. A cryptographic information reading unit reads, from a portable storage medium, cryptographic information including information used to specify a certain part of the content data on which cryptographic processing is to be performed. A part specifying unit specifies the certain part of the obtained content data based on the read cryptographic information. A cryptographic processing unit encrypts the certain part. Then, a content data recording unit records the encrypted content data onto the storage medium.

Using this construction, appropriate encryption can be performed by regulating the part of the content data to be encrypted according to storage medium type when data is stored onto a storage medium. Cryptographic information specifying the part to be encrypted is stored on the storage medium, along with newly encrypted content data. As a result, a general-purpose decryption apparatus reading the storage medium and decrypting content data can specify the appropriate part of the content data by using the cryptographic information on the storage medium.

Furthermore, the cryptographic apparatus of the present invention may have the following construction. A data obtaining unit obtains, from received data, content data, and cryptographic information including information used to specify a certain part of the content data on which cryptographic processing is to be performed. The received data consists of content data and cryptographic information that has been multiplexed and transmitted. A part specifying unit specifies the certain part of the obtained content data based on the obtained cryptographic information. Then, cryptographic processing unit performs one of encryption and decryption on the certain part of the content data.

Using this construction, the cryptographic apparatus of the present invention can accurately specify a part of transmitted content data on which cryptographic processing is to be performed. Therefore, information for specifying the part in the content data does not need to be stored in advance in the cryptographic processing apparatus, and a general-purpose device performing cryptographic processing on content data in a variety of formats can be realized.

Furthermore, the cryptographic information may include sync pattern information showing a certain bit sequence. Here, the part specifying unit detects, in the content data, a sync pattern corresponding to the bit sequence shown in the sync pattern information, and uses a location of the sync pattern as a basis for specifying the certain part, the certain part having a fixed positional relationship to the sync pattern.

When the content data has a structure formed from alternating sync patterns and following parts, the above construction enables the part apart from the sync patterns to be specified.

Furthermore, the part specifying unit verifies the authenticity of the detected sync pattern by checking whether another sync pattern is located at a position a set interval away from the location of the detected sync pattern.

Here, the sync pattern can be verified, even when the transmitted bit sequence includes other data having the same bit sequence as the sync pattern, enabling more accurate specification of the part to be processed.

Furthermore, the cryptographic information may include flag pattern information showing a bit sequence, and position information specifying the position of the bit sequence. Here, the part specifying unit verifies whether the bit sequence shown by the flag pattern information exists at the position in the content data specified by the position information.

Using this construction, flag codes in the content data can be verified, thereby permitting more accurate specification of the part to be processed.

Furthermore, the cryptographic apparatus of the present invention may have the following construction. A content data obtaining unit obtains content data. A cryptographic information obtaining unit obtains cryptographic information including information specifying a part on which cryptographic processing is to be performed in the contents data. This information including a reference instruction indicating that a data section in the content data be referred to. Then, a part specifying unit specifies the certain part of the content data based on the cryptographic information by referring to the data section in the content data as indicated by the reference instruction. After this, a cryptographic processing unit performs one of encryption and decryption on the certain part.

Using this construction, the cryptographic apparatus of the present invention can accurately specify a part of the content data on which cryptographic processing is to be performed and perform the cryptographic processing by referring to a section in the content data, based for example on cryptographic information in a program.

Furthermore, the cryptographic processing unit encrypts the certain part of the content data. Here, the cryptographic apparatus further comprises a multiplexing transmission unit for multiplexing the encrypted content data and the cryptographic information and transmitting the multiplexed data.

In this construction, encrypted content data and corresponding cryptographic information is multiplexed and transmitted, enabling an apparatus receiving this data to correctly decrypt the content data.

Furthermore, a program recording medium of the present invention stores a control program for having a computer execute cryptographic processing on content data. The control program includes the following steps. A data reading step reads content data and cryptographic information from a portable storage medium. The cryptographic information includes information used to specify a certain part of the content data on which cryptographic processing is to be performed. Then, a part specifying step specifies the certain part of the read content data, based on the read cryptographic information. Finally, a cryptographic processing step for performing one of encryption and decryption on the certain part of the read content data.

Here, a computer that reads a control program recorded onto the program storage medium from memory and operates based on the read control program, accurately specifies a part of the content data stored on a storage medium, on which cryptographic processing is to be performed.

Furthermore, the program recording medium of the present invention may be a program recording medium storing a control program for having a computer storing content data execute cryptographic processing on the content data. The cryptographic processing includes encryption of the content data and recording of the encrypted content data onto a storage medium, and has the following steps. A cryptographic information reading step reads, from a portable storage medium, cryptographic information including information used to specify a certain part of the content data on which cryptographic processing is to be performed. A part specifying step specifies the certain part of the obtained content data based on the read cryptographic information. A cryptographic processing step encrypts the certain part. Finally, a content data recording step records the encrypted content data onto the storage medium.

Here, a computer that reads a control program recorded onto the program storage medium from memory and operates based on the read control program, performs encryption when content data is stored on a storage medium and the part of the content data to be encrypted is regulated by the storage medium.

Furthermore, the program recording medium of the present invention may be a program recording medium storing a control program for having a computer execute cryptographic processing on content data. The cryptographic processing includes the following steps. A data obtaining step obtains, from received data, content data, and cryptographic information including information used to specify a certain part of the content data on which cryptographic processing is to be performed. Here, the received data consists of content data and cryptographic information that has been multiplexed and transmitted. A part specifying step specifies the certain part of the obtained content data based on the obtained cryptographic information. A cryptographic processing step performs one of encryption and decryption on the certain part of the content data.

Here, a computer that reads a control program recorded onto the program storage medium from memory and operates based on the read control program accurately specifies a part of the transmitted content data on which cryptographic processing is to be performed, and performs cryptographic processing on this data.

Furthermore, the program recording medium of the present invention may be a program recording medium storing a control program for having a computer execute cryptographic processing on content data. The cryptographic processing includes the following steps. A content data obtaining step obtains content data. A cryptographic information obtaining step obtains cryptographic information including information specifying a part on which cryptographic processing is to be performed in the contents data. Here, this information includes a reference instruction indicating that a data section in the content data be referred to. A part specifying step specifies the certain part of the content data based on the cryptographic information by referring to the data section in the content data as indicated by the reference instruction. A cryptographic processing step performs one of encryption and decryption on the certain part.

Here, a computer that reads a control program recorded onto the program storage medium from memory and operates based on the read control program accurately specifies a part of the content data on which cryptographic processing is to be performed by referring to one section, a specific data section, of the content data, and then performs cryptographic processing on that part.

Furthermore, a data recording medium of the present invention may be a portable data recording medium storing encrypted content data, and including a content data recording area and a cryptographic information recording area. Content data, of which a certain part has been encrypted, is recorded in the content data recording area. Cryptographic information, including information used to specify the certain part of the content data, is recorded in the cryptographic information recording area in which.

This enables a part that is to be decrypted to be specified to a general-purpose decryption apparatus.

Furthermore, a cryptographic processing method of the present invention may be a cryptographic processing method, having the following steps. A data reading step reads content data and cryptographic information from a portable storage medium. Here, the cryptographic information includes information used to specify a certain part of the content data on which cryptographic processing is to be performed. A part specifying step specifies the certain part of the read content data, based on the read cryptographic information. A cryptographic processing step performs one of encryption and decryption on the certain part of the read content data.

If the cryptographic processing method of the present invention is used, a part of the content data stored on a storage medium can be accurately specified and cryptographic processing performed on the part.

Furthermore, the cryptographic processing method of the present invention may be a cryptographic processing methods encrypting content data and recording the encrypted content data onto a storage medium. This method includes the following steps. A cryptographic information reading step reads, from a portable storage medium, cryptographic information including information used to specify a certain part of the content data on which cryptographic processing is to be performed. A part specifying step specifies the certain part of the obtained content data based on the read cryptographic information. A cryptographic processing step encrypts the certain part. A content data recording step records the encrypted content data onto the storage medium.

Therefore, the cryptographic processing method relating to the present invention enables cryptographic processing to be appropriately performed when content data is stored on to a storage medium and the part in the content data that should be encrypted is regulated by the storage medium used.

Furthermore, the cryptographic processing method of the present invention may be a cryptographic processing method performing cryptographic processing on content data. This method includes the following steps. A data obtaining step obtains from received data, content data, and cryptographic information including information used to specify a certain part of the content data on which cryptographic processing is to be performed. Here, the received data consists of content data and cryptographic information that has been multiplexed and transmitted. A part specifying step specifies the certain part of the obtained content data based on the obtained cryptographic information. Then, a cryptographic processing step performs one of encryption and decryption on the certain part of the content data.

Therefore, the cryptographic processing method of the present invention enables the part of the transmitted content data on which cryptographic processing is to be performed to be accurately specified and cryptographic processing performed on the part.

Furthermore, the cryptographic processing method of the present invention may be a cryptographic processing method performing cryptographic processing on content data, and including the following steps. A content data obtaining step obtains content data. A cryptographic information obtaining step obtains cryptographic information including information specifying a part on which cryptographic processing is to be performed in the contents data. The information includes a reference instruction indicating that a data section in the content data be referred to. A part specifying step specifies the certain part of the content data based on the cryptographic information by referring to the data section in the content data as indicated by the reference instruction. A cryptographic processing step of encryption and decryption on the certain part.

Therefore, the cryptographic method of the present invention enables a part of the content data on which cryptographic data is to be processed to be accurately specified by referring to one part of the content data and cryptographic processing performed. This operation is performed based on cryptographic information from a program or similar.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1A shows an example of the sections on which cryptography is to be performed when content data is constructed from packets of a fixed length;

FIG. 1B shows an example of the sections on which cryptography is to be performed when content data is constructed from packets of a variable length;

FIG. 1C shows the situation when cryptography is repeatedly performed on content data in a constant cycle;

FIG. 2 is a block diagram of a decryption apparatus 1100 in a first embodiment;

FIG. 3 illustrates functions which can be used as cryptographic information;

FIG. 4 shows an example of cryptographic information written using the functions in FIG. 3;

FIG. 10 shows the data construction of type-specific cryptographic information 1531 recorded in a data memory unit 1530;

FIG. 17 shows instruction descriptors forming the cryptographic information 2111;

FIG. 19 shows the data construction of area descriptor information;

FIG. 30 shows the construction of a stream that is one example of content data 2131 input into the cryptographic apparatus 2340; and FIG. 31 shows an example of cryptographic information 2111 input into the cryptographic apparatus 2340 in order to process the stream shown in FIG. 30.

DESCRIPTION OF THE PREFERRED EMBODIMENTS

First Embodiment

Figure 5:
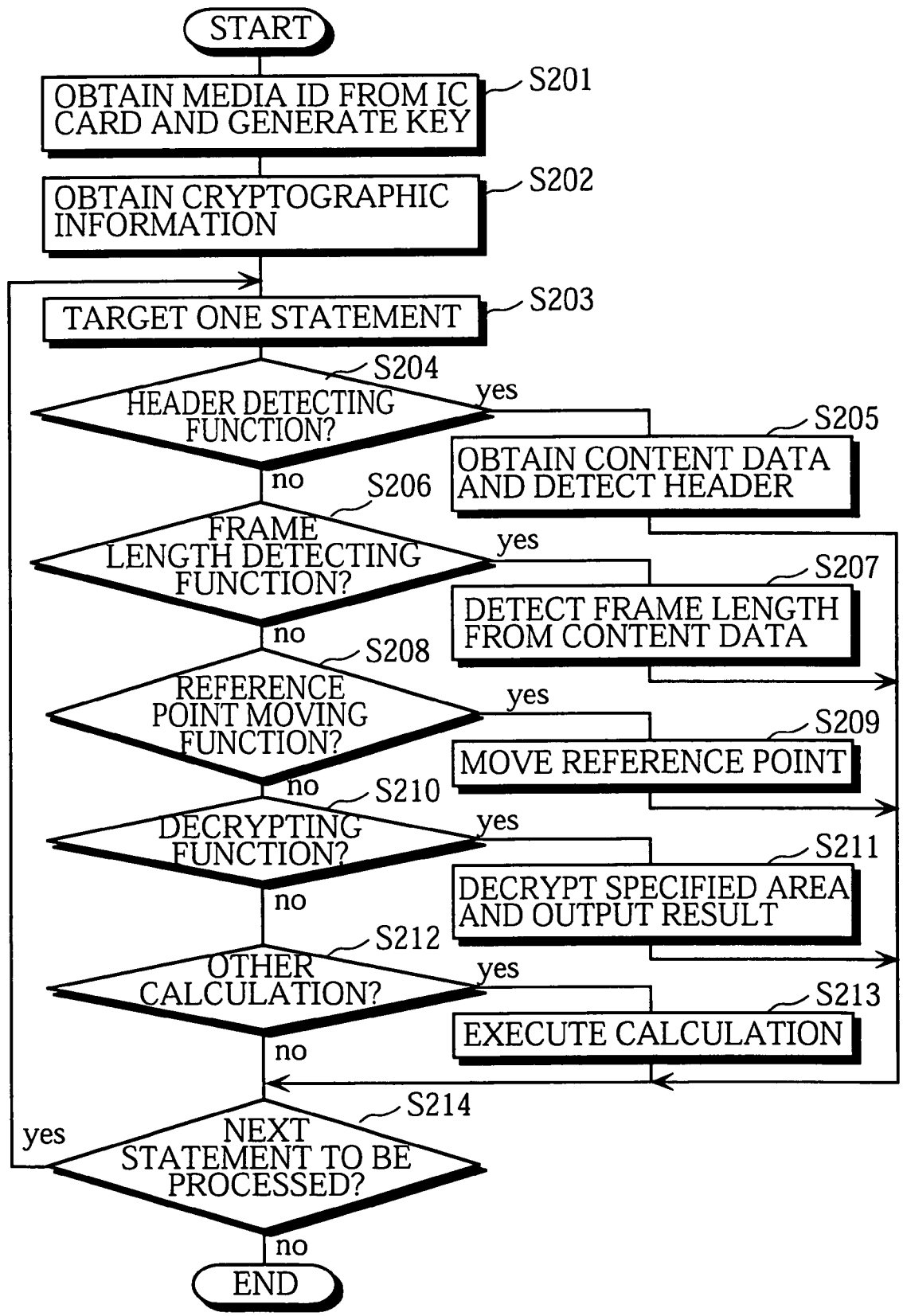
FIG. 5 is a flowchart showing the operation of the decryption apparatus 1100.

The following is a description of a cryptographic apparatus in a first embodiment of the invention, with reference to FIGS. 2 to 8.

Construction of Decryption Apparatus

FIG. 2 is a block diagram of an decryption apparatus 1100 in the first embodiment of the invention. The drawing also shows an IC card 1200 storing encrypted content data, which is to be processed by the decryption apparatus 1100.

The IC card 1200 includes a data storage unit 1230 and a media ID storage unit 1220, both formed from semi-conductor memory, that is semi-conductor circuitry, and a control unit 1210 controlling access to the data stored in the semi-conductor memory, and capable of performing functions such as verification of the authenticity of a connected device. IC cards are generally used as data recording mediums in digital cameras, portable audio players and the like.

Here, the media ID storage unit 1220 stores a media ID identifying the IC card 1200. The data storage unit 1230 stores cryptographic information 1231 and encrypted content data 1232. The cryptographic information 1231 specifies the decryption method that is to be used to decrypt the content data 1232. A more detailed description of this information is given later in this specification.

The decryption apparatus 1100 reads and decrypts encrypted content data recorded on the IC card 1200. In terms of hardware, it is formed from a computer that is provided with a CPU, memory and the like. Functionally, it has a control unit 1110, a header detecting unit 1120, a frame length detecting unit 1130, a decrypting unit 1140 and a key generating unit 1150. The various functional operations of the decryption apparatus 1100 are realized when the CPU executes a control program stored in memory.

Here, the control unit 1110 has a cryptographic information obtaining/interpreting unit 1111 and a content data obtaining unit 1112. The control unit 1110 controls each component of the decryption apparatus 1100, for example performing mutual authentication with the control unit 1210 in the IC card 1200, and has the media ID, cryptographic information 1231 and content data 1232 read from the IC card 1200.

The cryptographic information obtaining/interpreting unit 1111 reads the cryptographic information 1231 stored in the data storage unit 1230 in the IC card 1200, interprets the read information, and controls the header detecting unit 1120, the frame length detecting unit 1130 and the encrypting unit 1140 according to the interpretation result.

The content data obtaining unit 1112 reads the content data 1232 stored in the data storage unit 1230 in the IC card 1200.

The header detecting unit 1120 detects the header portion of content data having a data construction that includes a header. The frame detecting unit 1130 detects the length of data sections, when, for example, content data is formed from a set of data divided into variable-length sections; in other words it detects frame length.

The key generating unit 1150 obtains the media ID of the IC card 1200 from the control unit 1110, and generates a decryption key by performing specified calculation based on the media ID.

The encrypting unit 1140 uses the key generated by the key generating unit 1150 to decrypt specified sections of the encrypted content data, and outputs the decryption result outside of the decryption apparatus 1100, for example to a device indicated by the content data.

Cryptographic Information Obtained and Interpreted by the Decryption Apparatus

The following is a description of the cryptographic information 1231.

The cryptographic information 1231 is formed from information and processing method descriptors required to specify the sections of the content data 1232 on which decryption is to be implemented, and the algorithm used for decryption. This information is described using a predetermined language. The cryptographic information 1231 is recorded on the IC card 1200 by the encryption apparatus that encrypts the content data 1232. Furthermore, the cryptographic information obtaining/interpreting unit 1111 which interprets the cryptographic information 1231 described in the predetermined language is an interpreter. Hereafter the cryptographic information obtaining/interpreting unit 1111 will be referred to as the cryptographic information interpreter 1111 for the sake of convenience.

FIG. 3 illustrates functions that may be used to form the cryptographic information. As shown in the drawing, four specialized functions are determined. These are a header detecting function, a frame length detecting function, a reference point moving function and an decrypting function. These four specialized functions are used to specify the section of the content data that is to be decrypted.

The header detecting function detects a header from the content data, and moves the reference point to the header. This processing is performed by the header detecting unit 1120. A reference point is used in all of the specialized functions and shows the position of the data to be processed by each function.

The header detecting function head_detect has three arguments. A first argument detect_pattern_size shows the number of bits in the bit pattern of the header to be detected. A second argument detect_pattern shows the bit pattern for the header to be detected. A third argument pnt_offset shows the point at which header detection starts. In other words, the header detecting function finds headers having a length equivalent to the number of bits shown by detect_pattern_size and a bit pattern shown by detect_pattern, starting from the header detection start point shown by pnt_offset. The header detecting function then moves the reference point to the position of the header that was first detected, and returns, taking the reference point as a return value.

The frame length detecting function is normally used after the header detecting function, and specifies the length of pieces of variable-length data, in other words frame length. The processing for this function is performed by the frame length detecting unit 1130. The frame length detecting function framelength_detect has three arguments. A first argument length_code_position shows the position at which the header is detected, in other words the position of the frame length code based on the reference point. A second argument lengthcode_length shows the length of the frame length code. A third argument unit shows the unit of the value showing the frame length code, in other words 1 if the code is in bit units or 8 if it is in byte units. The frame length code is data showing the frame length. This means that the frame length detecting function moves the number of bits shown in length_code_position from a current reference point, and takes this position as a new reference point. Then the frame length detecting function reads a frame length code with the number of bits shown by lengthcode_length from this new position, multiplies the read value with the value shown by unit in order to calculate the frame length, and returns, taking the frame length value as the return value.

The reference point moving function moves the reference point. The reference point moving function reference_point_move has an argument move_no that shows the number of bits the reference point is to be moved.

The decrypting function decrypts specified sections of the data, and is performed by the decrypting unit 1140. The decrypting function decryption has four arguments. A first argument algorithm_no is a number indicating the type of the decryption algorithm. Here, algorithms such as DES and FEAL are given predetermined numbers, in this case 1 and 2 respectively. The first argument indicates and obtains a decryption algorithm having the qualities of a so-called block cipher algorithm. A second argument mode predetermines numbers for the application modes of the decryption algorithm so that, for example, ECB is 1, OFB is 2, and CBC is 3. A third argument blocklength is the bit length of the block on which encryption is to be implemented. A fourth argument end_pnt is a pointer showing the extent of the section covered by the encryption processing. In other words, the decrypting function implements the decryption indicated by algorithm_no and mode on each blocklength of the data extending from the reference point to the position shown by end_pnt. If the number of bits from the reference point to the position shown by end_pnt cannot be evenly divided by the bit length shown by blocklength, decryption is implemented as many times as is possible without passing end_pnt. FIG. 4 shows an example of cryptographic information written using the functions shown in FIG. 3.

In the example shown in the drawing, the header bit pattern is expressed in hexadecimal notation as a 12-bit value 0xfff. This is an example containing instructions for implementing decryption using the DES algorithm in CBC mode on content data constructed so that a 13-bit frame length code starts at the 31st bit from the start point of the header, decryption being implemented on sections of the data corresponding to frames. In the drawing, '=' indicates that a variable on the left side of the sign is to be replaced by a variable or constant on the right of the sign. The phrase 'while(endof data)' followed by { . . . } indicates that the processing in { . . . } is to be repeated from the start until the end of the content data. The code ref_pnt is a variable indicating the reference point.

In this example, the variable ref_pnt indicating the reference point is set at an initial value of 0 bit. Next a header is detected, a frame length code is detected, and the reference point is moved to a position immediately after the frame length code. Then the point representing the end of decryption processing is calculated based on the detected frame length and decryption implemented. Following this, the reference point is moved to the point representing the end of the decryption processing. The processing sequence is repeated, starting with detection of another header. Thus, in this example, instructions indicate that decryption processing should be implemented on areas in the content data which exclude the sections extending from the start of each header to the end of the frame length code.

Note that if the functions shown in FIG. 3 are combined in an arbitrary fashion and used to write the cryptographic information it is possible to indicate decryption of only the frames in content data having a construction in which headers and frames of a fixed length are repeated. It may also be possible to indicate repeated decryption of data sections having a fixed length (see FIG. 1C).

Operation of the Decryption Apparatus

The following is an explanation of the operation of a decryption apparatus 1100 having the construction described above. Here, the cryptographic information 1231 stored in the data storage unit 1230 in the IC card 1200 is identical to that shown in FIG. 4.

FIG. 5 is a flowchart showing the operation of the decryption apparatus 1100.

As shown in FIG. 5, the control unit 1110 in the decryption apparatus 1100 obtains the media ID stored in the media ID storage unit 1230 by communicating with the control unit 1210 in the IC card 1200, and passes the media ID to the key generating unit 1150. Having received the media ID, the key generating unit 1150 performs specified calculations based on the media ID, thereby generating a decryption key (step S201).

Once the decryption key has been generated, the cryptographic information interpreter 1111 obtains the cryptographic information 1231 stored in the data storage unit 1230 via the control unit 1210 in the IC card 1200, and stores the obtained information in memory or similar (step S202).

Once the cryptographic information 1231 has been obtained, the cryptographic information interpreter 1111 targets, interprets and then executes related processing for each line of the cryptographic information 1231 in turn (steps S203 to S214).

First, the cryptographic information interpreter 1111 targets ref_pnt=0; shown in FIG. 4 (step S203), and since this is not one of the four specialized functions but a calculation (step S212), sets the variable ref_pnt at 0 (step S213). Next, 'while(endofdata)' { . . . } is shown, so the processing inside { . . . } is executed repeatedly for as long as content data to be processed can be obtained (steps S214, S203).

In other words, the cryptographic information interpreter 1111 first targets ref_pnt=head_detect(12,0xfff,ref_pnt); (step S214, S203), and since this is the header detecting function, (step S204), has the content data obtaining unit 1112 obtain the content data 1232 via the control unit 1200 in the IC card 1200, and store it in memory or similar. Then the cryptographic information interpreter 1111 detects a header section with a an 0xfff bit pattern expressed in hexadecimal notation. This detection starts at the front of the content data 1232 (step S205). The position of the detected header resulting from the execution of the header detecting function is set in a register or similar which has been designated as a register for holding the reference point (hereafter this register is referred to as the reference point register), and also as the variable ref_pnt. The reference point register can be accessed and updated by any of the cryptographic information interpreter 1111, the header detecting unit 1120, the frame length detecting unit 1130 and the encrypting unit 1140.

Next, the cryptographic information interpreter 1111 targets pnt_offset=ref_pnt; (step S203), and sets the value of the variable ref_pnt in the variable pnt_offset (step S212, S213).

Following this, the cryptographic information interpreter 1111 targets the next statement frame_length=frame_length_detect(31,13,8); (step S214, S203), and since this is the frame length detecting function (step S206), has the frame length detecting unit 1130 detect the frame length. The frame length detecting unit 1130 sets the 31st bit from the current reference point in the content data as the new reference point, obtains a 13-bit frame length code starting from this point, and multiplies this frame length code by 8 to calculate the frame length. The frame length obtained as a result of this frame length detecting function is set in the variable frame_length.

Once the frame length detecting function has been processed, the cryptographic information interpreter 1111 targets the next statement ref_pnt=reference_point_move (13); (step S214, S203), and since this is the reference point moving function (step S208) moves the reference point exactly 13 bits, storing the new reference point in the reference point register, while setting it in the variable ref_pnt.

Once the reference point moving function has been processed, the cryptographic information interpreter 1111 targets the next statement end_pnt=pnt_offset+framelength; (step S214, S203), and sets the sum of the variables pnt_offset and framelength in the variable end_pnt (steps S212, S213).

Following this, the cryptographic information interpreter 1111 targets the next statement decryption(1,3,64,end_pnt); (steps S214, S203), and since it is the decrypting function (step S210), has the decrypting unit 1140 implement decryption on a specified section of content data 1232 (step S211). This means that the decrypting unit 1140 uses the key generated by the key generating unit 1150 to implement decryption, using the DES algorithm in CBC mode, on an area in the content data 1232 that extends from the current reference point to the position shown by the variable end_pnt.

Once the decrypting function has been processed, the cryptographic information interpreter 1111 targets the next statement ref_pnt=end_pnt; (steps S214, S203), and sets the value of the variable end_pnt in the variable ref_pnt (steps S212, S213). Then, the cryptographic information interpreter 1111 repeats processing of the statements from ref_pnt=head_detect(12,0xfff,ref_pnt; to ref_pnt=end_pnt;, until an unprocessed header can no longer be detected by executing the header detecting function (steps S203 to S214).

Figure 6:
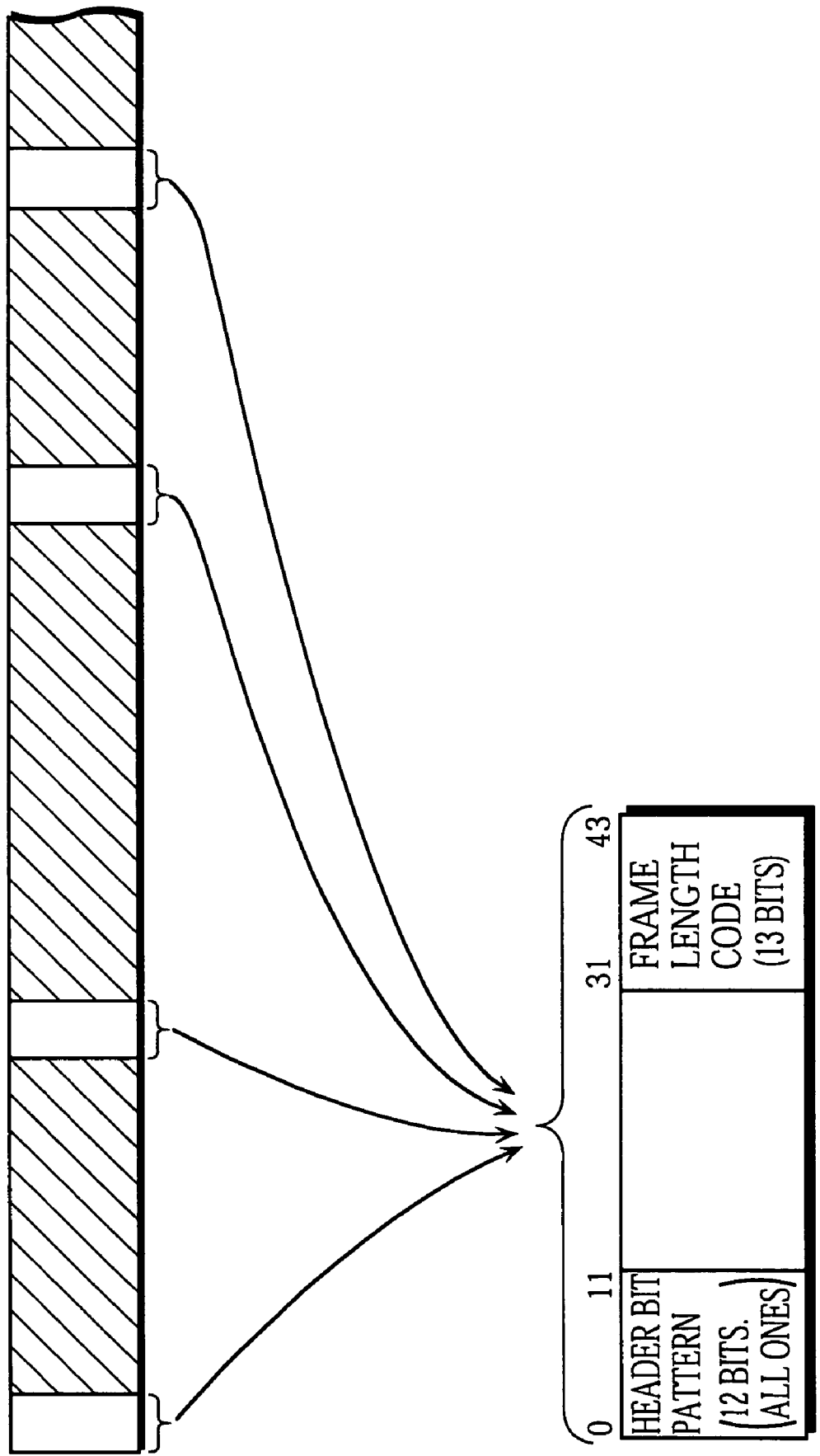
FIG. 6 shows content data 1232 on which decryption is implemented according to the cryptographic information shown in FIG. 3.

FIG. 6 shows the content data 1232 on which decryption is implemented according to the cryptographic information shown in FIG. 4. An enlargement of the section of the content data 1232 that is not decrypted, in other words the header section, is shown in the lower half of the drawing.

The shaded sections of the content data 1232 shown in FIG. 6 are the sections decrypted by the decryption apparatus 1100.

Note that content data with this kind of variable length frame construction may be audio data in MPEG2 or MPEG4 format that has been compressed using AAC. If random access is desired when playing back this kind of audio data, a desired frame needs to be accessed and play back performed. Detecting frame positions becomes easier if the sections of the data apart from the frames are not encrypted. As a result, encryption is only implemented on the shaded sections of the content data in the IC card 1200, and cryptographic information 1231 that reflects such a data construction is generated.

This means that the decryption apparatus 1100 can specify the sections of the content data 1232 to be decrypted, and the decryption algorithm by referring to the cryptographic information 1231 stored along with the content data 1232 on the IC card 1200. As a result, the decryption apparatus 1100 can decrypt the appropriate sections of the content data 1232 without itself needing to store information specifying the sections of the data on which decryption should be implemented and the decryption algorithm that should be used. In other words, if the encryption apparatus that encrypted the content data 1232 records cryptographic information 1231 representing the decryption method corresponding to this encryption method onto an IC card, the content data 1232 can be accurately decrypted by a general-purpose decryption apparatus 1100. This means that a specialized decryption apparatus that only performs decryption processing of a certain construction on content data of a specified type is not required.

Construction of Encryption Apparatus

The following is a description of the encryption apparatus 1300 that encrypts the content data 1232 before it is stored on the IC card 1200. The encryption apparatus 1300 encrypts the content data 1232, as well as generating the cryptographic information 1231.

Figure 7:
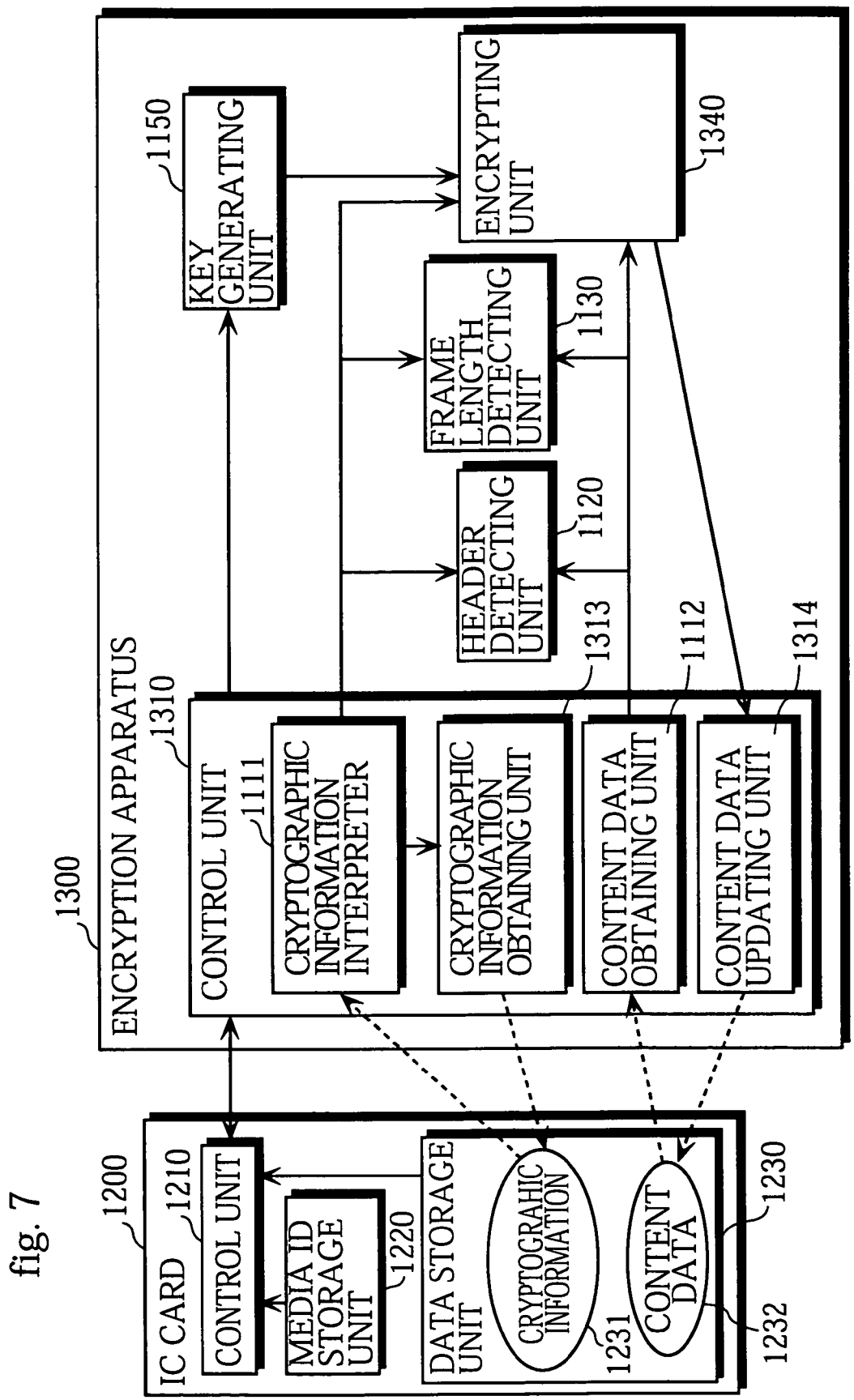
FIG. 7 is a block diagram of an encryption apparatus 1300.

FIG. 7 is a block diagram of the encryption apparatus 1300. In the drawing, the IC card 1200 storing the content data 1232 to be encrypted by the encryption apparatus 1300 is also shown.

Functional components with the same numerical references as in FIG. 2 have the same function, so further explanation of such components is omitted here. The cryptographic information shown in FIG. 7 was originally different to that shown in FIG. 2, but the operation of the encryption apparatus 1300 makes it identical. Furthermore, the content data 1232 shown in FIG. 7 is originally plaintext, but it is encrypted by the encryption apparatus 1300, forming data identical to that shown in FIG. 2.

The encryption apparatus 1300 reads and encrypts content data 1232 recorded on the IC card 1200. In terms of hardware, it is formed from a computer that is provided with a CPU, memory and the like. Functionally, it has a control unit 1310, a header detecting unit 1120, a frame length detecting unit 1130, an encrypting unit 1340 and a key generating unit 1150. The various functional operations of the encryption apparatus 1300 are realized when the CPU executes a control program stored in memory.

The control unit 1310 has a cryptographic information interpreter 1111, a content data obtaining unit 1112, a cryptographic information updating unit 1313, and a content data updating unit 1314. The control unit 1110 controls each part of the encryption apparatus 1300, for example performing mutual authentication with the control unit 1210 in the IC card 1200. It reads the media ID from the IC card 1200, and reads/writes the cryptographic information 1231 and content data 1232 from/to the IC card 1200.

The cryptographic information interpreter 1111 reads and interprets the cryptographic information 1231 stored in the data storage unit 1230 of the IC card 1200, and controls the header detecting unit 1120, the frame length detecting unit 1130 and the encrypting unit 1340 according to the result of the interpretation.

The content data obtaining unit 1112 reads the content data 1232 stored in the data storage unit 1230 in the IC card 1200.

The cryptographic information updating unit 1313 updates the cryptographic information 1231 stored in the data storage unit 1230 in the IC card 1200.

The content data updating unit 1314 updates content data 1232 stored in the data storage unit 1230 in the IC card 1200.

The key generating unit 1150 obtains the media ID of the IC card 1200 from the control unit 1310, and generates an encryption key by performing specified calculations based on this media ID.

The encrypting unit 1340 uses the key generated by the key generating unit 1150 to encrypt specified sections of the content data 1232, and transmits the encrypted result to the IC card 1200 via the content data updating unit 1314, thereby updating the content data 1232.

Cryptographic Information Obtained as a Result of Interpretation by the Encryption Apparatus The following is a description of the cryptographic information 1231 that is interpreted and executed by the encryption apparatus 1300. The cryptographic information 1231 is basically the same as that obtained through interpretation by the decryption apparatus, except for the fact that an encryption function is used in place of the decryption function. The encrypting function encryption is formed from information and processing method descriptors required to specify the sections of the content data 1232 that are to be encrypted, and an encryption algorithm. Here, the encrypting function encryption has the same arguments as the decrypting function decryption, and only differs in the fact that it implements encryption rather than decryption. Therefore, the four specialized functions interpreted and executed by the encryption apparatus 1300 are the header detecting function, the frame detecting function, the reference point moving function and the encrypting function.

Before being obtained by the encryption apparatus 1300, the cryptographic information 1231 is stored on the IC card 1200, together with the content data 1232, by an apparatus that specifies a data construction, generates content data 1232 and records it in the IC card 1200.

Operation of Encryption Apparatus

The following is an explanation of the operation of an encryption apparatus 1300 having the above construction. Note that the cryptographic information 1231 stored on the IC card 1200 is assumed to be identical to that shown in FIG. 4, apart from the fact that decryption(1,3,64,end_pnt); has been replaced by encryption(1,3,64,end_pnt).

Figure 8:
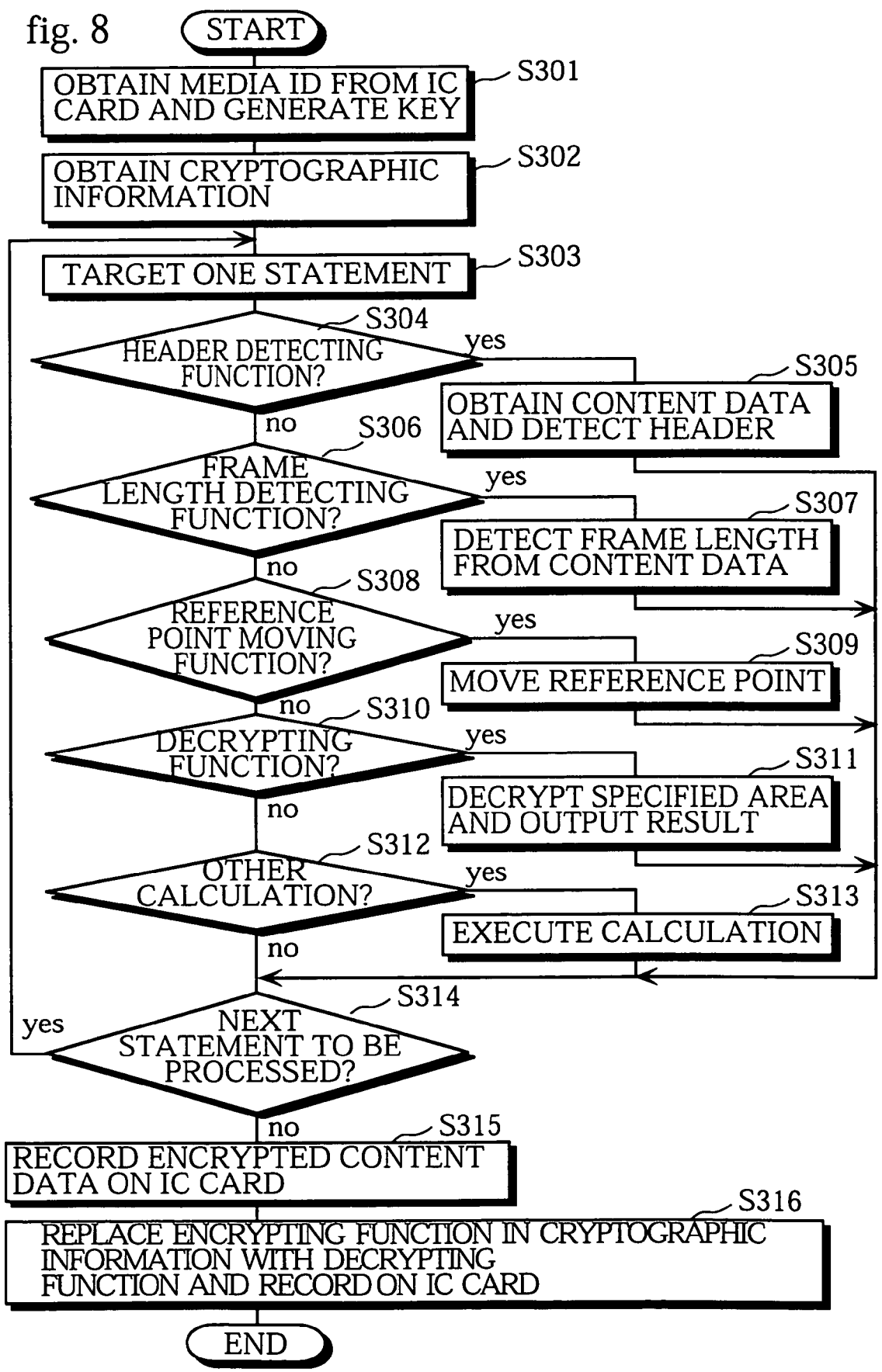
FIG. 8 is a flowchart showing the operation of the encryption apparatus 1300.

FIG. 8 is a flowchart showing the operation of the encryption apparatus 1300.

As shown in FIG. 8, the control unit 1310 in the encryption apparatus 1300 obtains the media ID stored in the media ID storage unit 1230 by communicating with the control unit 1210 in the IC card 1200, and passes the media ID to the key generating unit 1150. Having received the media ID, the key generating unit 1150 performs specified calculations based on the media ID, thereby generating an encryption key (step S301).

Once the encryption key has been generated, the cryptographic information interpreter 1111 obtains, via the control unit 1210 in the IC card 1200, the cryptographic information 1231 stored in the data storage unit 1230, and stores the obtained information in memory or the like (step S302).

Once the cryptographic information 1231 has been obtained, the cryptographic information interpreter 1111 targets, interprets and then executes related processing for each line of the cryptographic information 1231 in turn (steps S303 to S314). Note that the processing of steps S303 to S309 is identical to that of steps S203 to S209 in FIG. 5, and the processing of steps S312 to 314 to that of steps S212 to S214, so these steps are not described in detail here.

First, the cryptographic information interpreter 1111 targets ref_pnt=0; and sets the variable ref_pnt at 0 (steps S312, S313). Next, 'while(endofdata)' { . . . } is shown, so the processing inside { . . . } is executed repeatedly for as long as the content data that forms the processing object can be obtained (steps S314, S303).

The cryptographic information interpreter 1111 targets pnt_offset=ref_pnt; and sets the value of the variable ref_pnt in the variable pnt_offset (steps S312, S313). Next, the cryptographic information interpreter 1111 targets the following ref_pnt=head_detect(12,0xfff,ref_pnt), and has the content data obtaining unit 1112 obtain the content data 1232, and detect a header section (steps S304, S305). Following this, the cryptographic information interpreter 1111 targets the next statement frame_length=frame_length_detect(31,13,8); and has the frame length detecting unit 1130 detect the frame length (steps S306, S307). Next, the cryptographic information interpreter 1111 targets the statement ref_pnt=reference_point_move(13);, and moves the reference point 13 bits, storing the new reference point in the reference point register, while setting it in the variable ref_pnt (steps S308, S309). The cryptographic information interpreter 1111 then targets the statement end_pnt=pnt_offset+framelength;, and sets the sum of the variables pnt_offset and framelength in the variable end_pnt (steps S312, S313). Following this, the cryptographic information interpreter 1111 targets the next statement encryption(1,3,64,end_pnt); (steps S314, S303) and since it is the encrypting function (step S310), has the encrypting unit 1340 implement encryption on a specified section of content data 1232 (step S311). This means that the encrypting unit 1340 uses the key generated by the key generating unit 1150 to implement encryption, using the DES algorithm in CBC mode, on an area in the content data 1232 that extends from the current reference point to the position shown by the variable end_pnt.

Once the encrypting function has been processed, the cryptographic information interpreter 1111 targets the next statement ref_pnt=end_pnt; and sets the value of the variable end_pnt in the variable ref_pnt (steps S312, S313). Then, the cryptographic information interpreter 1111 repeats processing of the statements from pnt_offset=ref_pnt; to ref_pnt=end_pnt;, until an unprocessed header can no longer be detected when the header detecting function is executed (steps S303 to S314).

Following the completion of the repeated processing of while(endofdata) { . . . }, the content data updating unit 1314 records the encrypted content data in the data storage unit 1230 of the IC card 1200 by communicating with the control unit 1210 in the IC card 1200 (step S315). This enables the content data 1232 stored in the data storage unit 1230 to be updated.

Once the content data 1232 has been updated, the cryptographic information updating unit 1313 alters the descriptor encryption(1,3,64,end_pnt); in the cryptographic information 1231 to decryption(1,3,64,end_pnt); and records the altered cryptographic information 1231 in the data storage unit 1230 via the control unit 1210 (step S316). This enables the cryptographic information stored in the data storage unit 1230 to be updated.

This means that the encryption apparatus 1300 can specify the sections of the content data 1232 to be encrypted, and the encryption algorithm, by referring to the cryptographic information 1231 stored along with the content data 1232 in the IC card 1200. As a result, the encryption apparatus 1100 can encrypt the appropriate sections of the content data 1232 without itself needing to store information specifying the sections of the data on which encryption should be implemented and the encryption algorithm that should be used, and record cryptographic information showing a decryption method corresponding to the encryption along with the encrypted content data 1232, on the IC card 1200.

Second Embodiment

The following is an explanation of a cryptographic apparatus in a second embodiment of the invention, with reference to FIGS. 9 to 12.

The cryptographic apparatus in the second embodiment combines the ability to read encrypted content data in the form of a file from an IC card and then decrypt the read data, with the ability to encrypt content data and record it on an IC card as a file. The cryptographic apparatus is characterized by the ability to switch decryption or encryption methods according the type of file used (hereafter file type).

Construction of Cryptographic Apparatus

Figure 9:
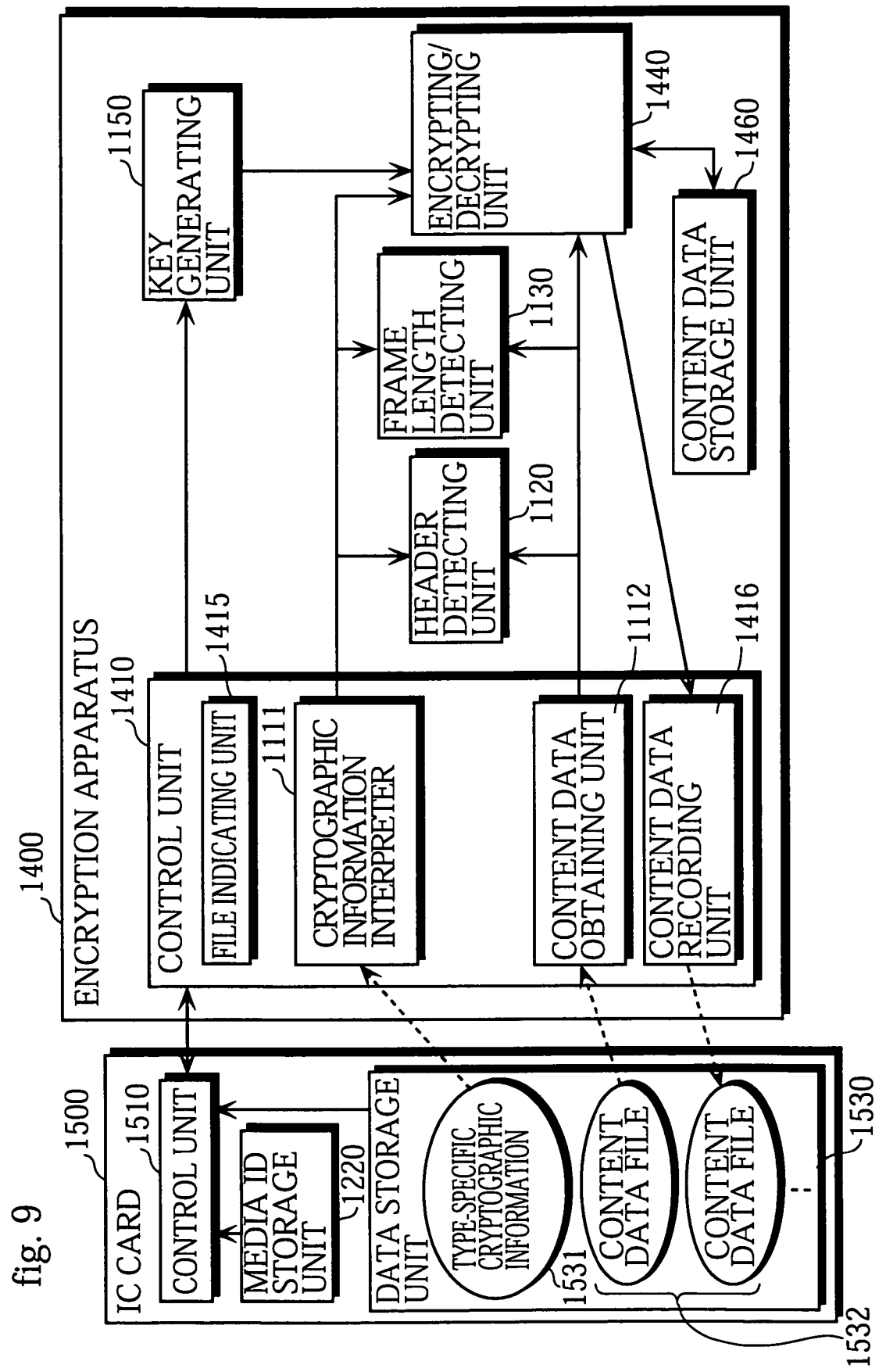
FIG. 9 is a block diagram of a cryptographic apparatus 1400 in a second embodiment.

FIG. 9 is a block diagram of a cryptographic apparatus 1400 in the second embodiment. The drawing also shows an IC card 1500 used for storing content data processed by the cryptographic apparatus 1400. Functional components identical to those in the first embodiment have the same numerical reference and are not described in detail here.

The IC card 1500 is the same as the IC card 1200 shown in the first embodiment in terms of hardware, having a data storage unit 1530 and a media ID storage unit 1220, both formed from semi-conductor memory, and a control unit 1510, that controls access to data stored in semi-conductor memory, formed from semi-conductor circuitry, and also performs functions such as verifying the authenticity of a connected device.

Here, the data storage unit 1530 stores type-specific cryptographic information 1531, and one or a plurality of content data files 1532, each content data file being a collection of content data. Content data files 1532 may be already stored in an encrypted state, or may be written by the cryptographic apparatus 1400. The type-specific cryptographic information 1531 is the same kind of cryptographic information shown in the first embodiment, with information for each file type having been grouped separately. A more detailed explanation of this type-specific cryptographic information 1531 is given later in this specification.

The control unit 1510 in the IC card 1500 performs mutual authentication with the cryptographic apparatus 1400, and receives a file name indication from the cryptographic apparatus 1400. Then the control unit 1510 obtains cryptographic information corresponding to the file type specified by the file name from the type-specific cryptographic information 1531, and transmits this cryptographic information together with the media ID stored in the media ID storage unit 1220 to the cryptographic apparatus 1400. Furthermore, the control unit 1510 records data transferred from the cryptographic apparatus 1400 as a file with the indicated file name, and transmits the content of the file with the file name indicated by the cryptographic apparatus 1400 to the cryptographic apparatus 1400.

The cryptographic apparatus 1400 reads and decrypts encrypted content data files recorded on the IC card 1500, and also encrypts content data, before storing it grouped as content data files on the IC card 1500. In terms of hardware, the cryptographic apparatus 1400 is constructed from a computer provided with a CPU, memory and the like. It includes the following functional components: a control unit 1410, a header detecting unit 1120, a frame length detecting unit 1130, an encrypting/decrypting unit 1440, a key generating unit 1150 and a content data storage unit 1460. The functional operations of the cryptographic apparatus 1400 are realized by the CPU executing a control program stored in memory. The IC card used need not be the same one, provided that it is compatible with the cryptographic apparatus 1400.

Here, the control unit 1410 includes a file name indicating unit 1415, a cryptographic information interpreter 1111, a content data obtaining unit 1112, and a content data recording unit 1416. The control unit 1410 controls each functional component of the cryptographic apparatus 1400, performing mutual authentication with the control unit 1510 in the IC card 1500, transfers a file name to the IC card 1500, reading a media ID, cryptographic information and content data files 1532, and indicates a file name to the IC card 1500, writing content data files 1532 as files in the IC card 1500.

The file name indicating unit 1415 indicates a file name of a content data file recorded on the IC card 1500, and also indicates a predetermined file name when recording encrypted content data onto the IC card 1500. Here, the file name is decided by a predetermined method, but it may alternatively be decided by information transferred from a device outside the cryptographic apparatus 1400, for example a user interface that obtains a file name for the content data from a user.

The cryptographic information interpreter 1111 receives cryptographic information from the IC card 1500, interprets the information, and controls the header detecting unit 1120, the frame length detecting unit 1130 and the encrypting/decrypting unit 1440 according to the interpretation result.

The content data recording unit 1416 records content data files containing encrypted content data in the data storage unit 1530 of the IC card 1500.

The content data storage unit 1460 is realized by a storage device such as memory, and obtains and stores content data to be processed by the encrypting/decrypting unit 1440 from a data processing device or similar outside of the cryptographic apparatus 1400. The content data storage unit 1460 also obtains content data previously processed by the encrypting/decrypting unit 1440, then the content data stored in the content data storage unit 1460 can be read by a device outside of the cryptographic apparatus, for example, a device displaying content data.

The encrypting/decrypting unit 1440 uses a key generated by the key generating unit 1150 to decrypt a specified section of encrypted content data, and outputs the decryption result to the content data storage unit 1460. Furthermore, the encrypting/decrypting unit 1440 obtains content data from the content data storage unit 1460, and uses a key generated by the key generating unit 1150 to encrypt specified sections of the content data, before recording the encrypted content data as a file in the data storage unit 1530 of the IC card 1500 via the content data recording unit 1416.

Type-Specific Cryptographic Information

FIG. 10 shows the data construction of type-specific cryptographic information 1531 stored in the data storage unit 1530.

As shown in FIG. 10, type-specific cryptographic information 1531 is composed of paired file types 1541 and cryptographic information 1542. Each file type 1541 shows the data construction type of the content data contained in the file, and is the part of the file name known as the file extension. The cryptographic information 1542 is similar to that described in the first embodiment, but in this embodiment the decrypting and encrypting functions are combined, so that, for example, encryption and decryption can both be carried out by the encrypting function encryption, without using the decrypting function decryption.

In other words, the type-specific cryptographic information 1531 is information determining specialized cryptographic information for each type of file extension. This specialized information is used to instruct a cryptographic apparatus to perform appropriate encrypting and decrypting operations, so that, for example, a content data file with a file name having an extension A is encrypted or decrypted using the type-specific cryptographic information for files with the extension A.

Note that the type-specific cryptographic information 1531 is not restricted to the file types of the content data currently stored by the IC card 1500, and includes information for all file types which have been predetermined as possible content data file types by the IC card 1500.

Operation of Cryptographic Apparatus

The following is an explanation of the operation of the cryptographic apparatus 1400.

Figure 11:
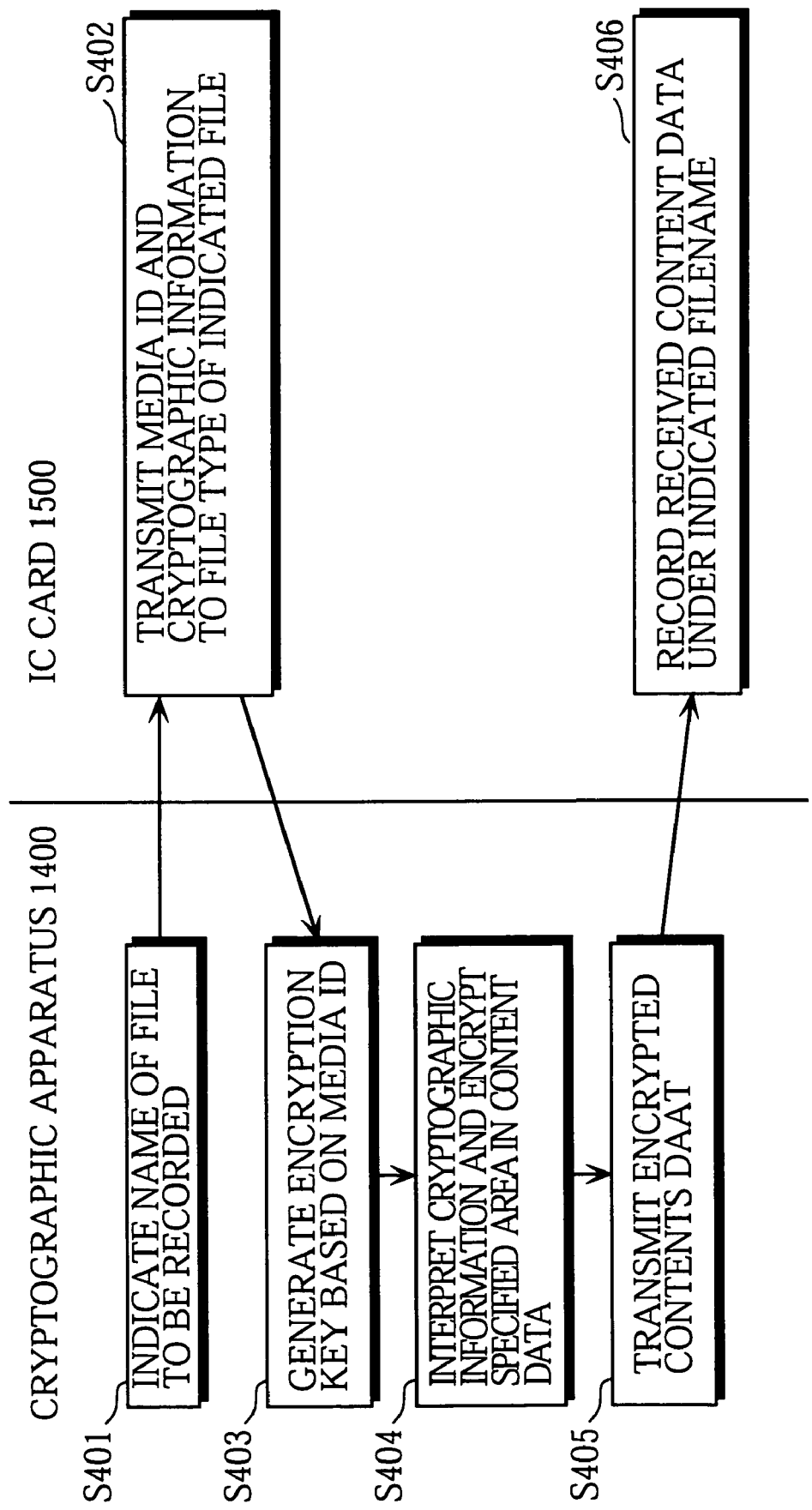
FIG. 11 shows a procedure in which a cryptographic apparatus 1400 records a content data file on an IC card 1500.

FIG. 11 shows the procedure used by the cryptographic apparatus 1400 to record content data files on the IC card 1500. The left side of the drawing shows operations performed by the cryptographic apparatus 1400 and the right side operations performed by the IC card 1500.

The control unit 1410 in the cryptographic apparatus 1400 outputs a file name, determined for example by the file name indicating unit 1415 according to a user instruction, to the control unit 1510 in the IC card 1500 (step S401). The control unit 1510 in the IC card 1500 extracts, from the type-specific cryptographic information 1531, cryptographic information corresponding to the file type specified in a file name obtained from the cryptographic apparatus 1400. The control unit 1510 then outputs this extracted cryptographic information to the control unit 1410 in the cryptographic apparatus 1400, along with the media ID stored in the media ID storage unit 1220 (step S402).

Having received the cryptographic information and the media ID, the control unit 1410 transfers the latter to the key generating unit 1150, which then generates an encryption key by performing specified calculation based on the received media ID (step S403). Then the control unit 1410 interprets the cryptographic information using the cryptographic information interpreter 1111, and controls the header detecting unit 1120, the frame length detecting unit 1130 and the encrypting/decrypting unit 1440 according to this interpretation result, thereby implementing encryption on content data already stored in the content data storage unit 1460 (step S404). In other words, the encrypting/decrypting unit 1440 obtains content data stored in the content data storage unit 1460 and implements encryption on only a specified area of the obtained data using an encryption key generated by the key generating unit 1150. The encryption algorithm used is that specified in the cryptographic information. Here, control based on the cryptographic information, including descriptors for of the header detecting, function, the frame length detecting function, the reference point moving function and the encrypting function, is performed as described in the first embodiment, and so further explanation is omitted.

Once the content data has been encrypted, the content data recording unit 1416 outputs the encrypted content data obtained from the encrypting/decrypting unit 1440 to the control unit 1510 in the IC card 1500 (step S405). In response, the control unit 1510 records the received content data as a content data file 1532 with the indicated file name in the data recording unit 1531 (step S406).

Figure 12:
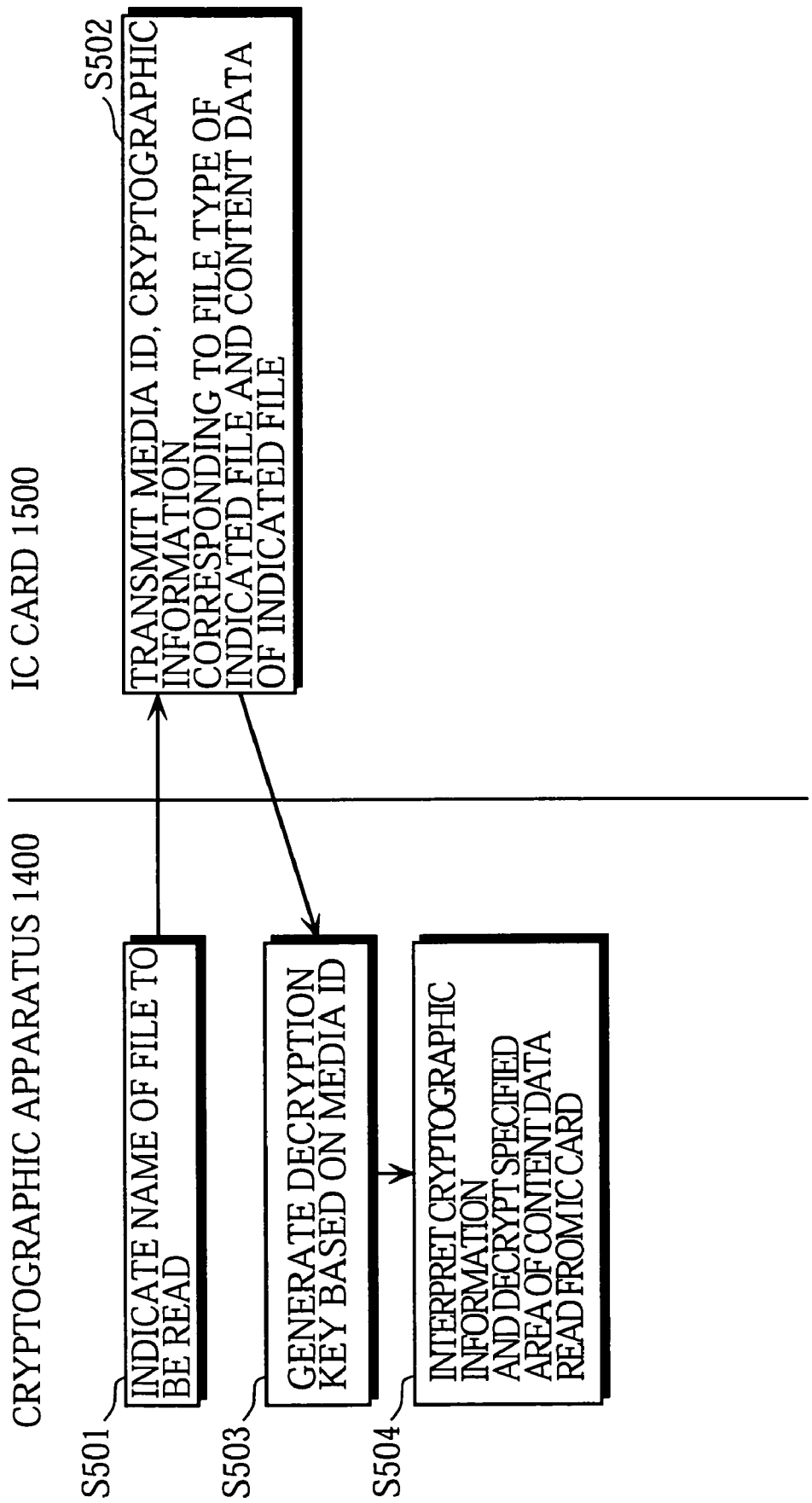
FIG. 12 shows a procedure in which a cryptographic apparatus 1400 reads and decrypts a content data file recorded on the IC card 1500.

FIG. 12 shows the procedure performed by the cryptographic apparatus 1400 when reading and decrypting a content data file recorded on the IC card 1500. The left side of the drawing shows operations performed by the cryptographic apparatus 1400, and the right side operations performed by the IC card 1500.

The control unit 1410 in the cryptographic apparatus 1400 outputs a file name, determined for example by the file name indicating unit 1415 according to a user instruction, to the control unit 1510 in the IC card 1500 (step S501). The control unit 1510 in the IC card 1500 extracts, from the type-specific cryptographic information 1531, cryptographic information corresponding to the file type specified by the file name obtained from the cryptographic apparatus 1400. The control unit 1510 then outputs this extracted cryptographic information to the control unit 1410 in the cryptographic apparatus 1400, along with the media ID stored in the media ID storage unit 1220 (step S502).

In response, the control unit 1410 transfers the media ID to the key generating unit 1150, which then generates a decryption key by performing specified calculation based on the received media ID (step S503). Then the control unit 1410 interprets the cryptographic information using the cryptographic information interpreter 1111, and controls the header detecting unit 1120, the frame length detecting unit 1130 and the encrypting/decrypting unit 1440 according to this interpretation result, thereby implementing decryption on content data transmitted from the IC card 1500 (step S504). In other words, the encrypting/decrypting unit 1440 implements decryption on only a specified area of the content data transferred from the IC card 1500 using a decryption key generated by the key generating unit 1150, and stores the resulting content data in the content data storage unit 1460.

As described above, the cryptographic apparatus 1400 reads a content data file stored in the IC card 1500, and decrypts it using an appropriate method for the file type concerned. The cryptographic apparatus 1400 also records data encrypted using a method that corresponds to the file type specified by the IC card 1500, in the IC card 1500 as a file of the specified type.

Third Embodiment

Figure 13:
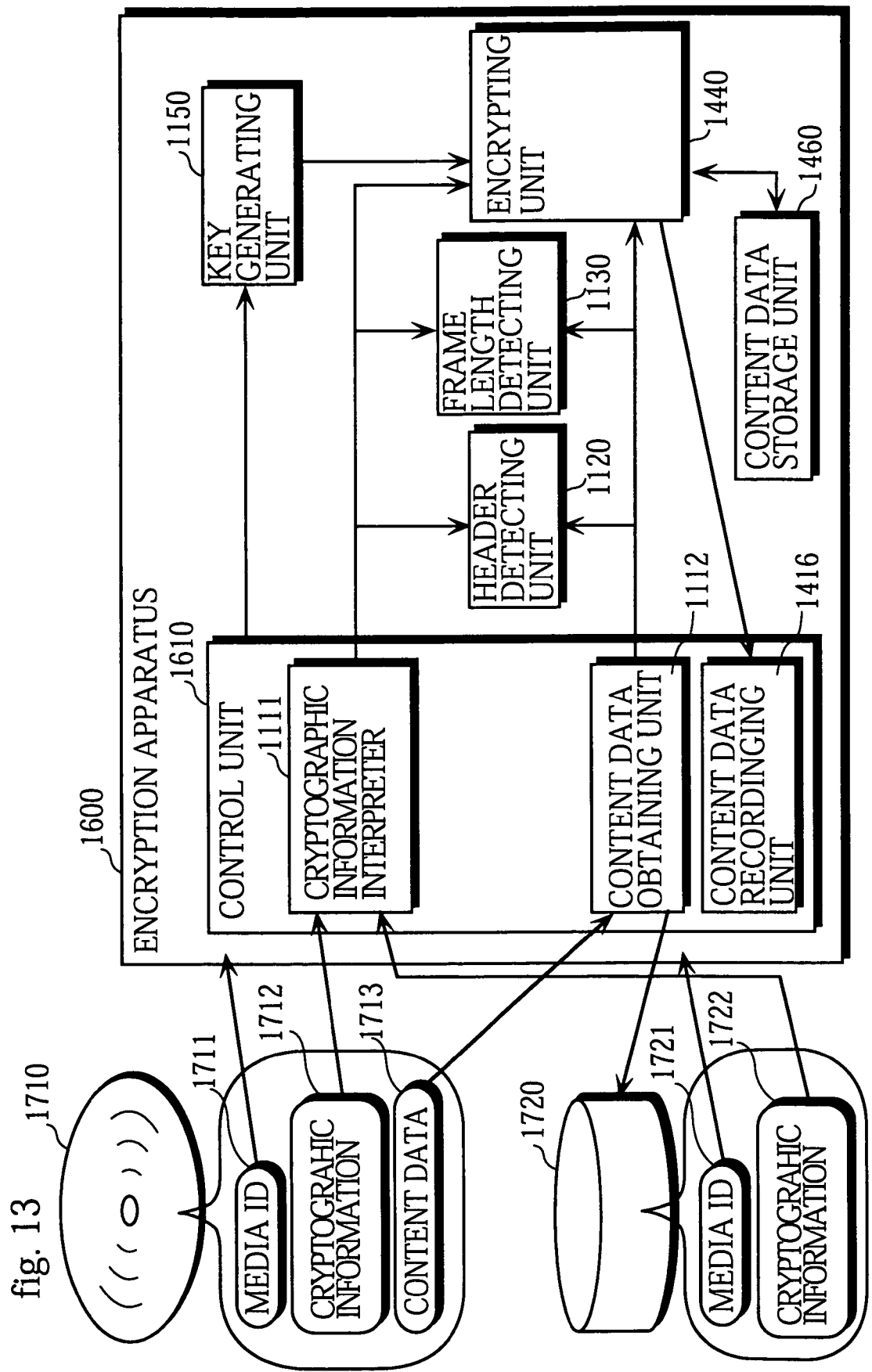
FIG. 13 is a block diagram of a cryptographic apparatus 1600 in a third embodiment.
Figure 14:
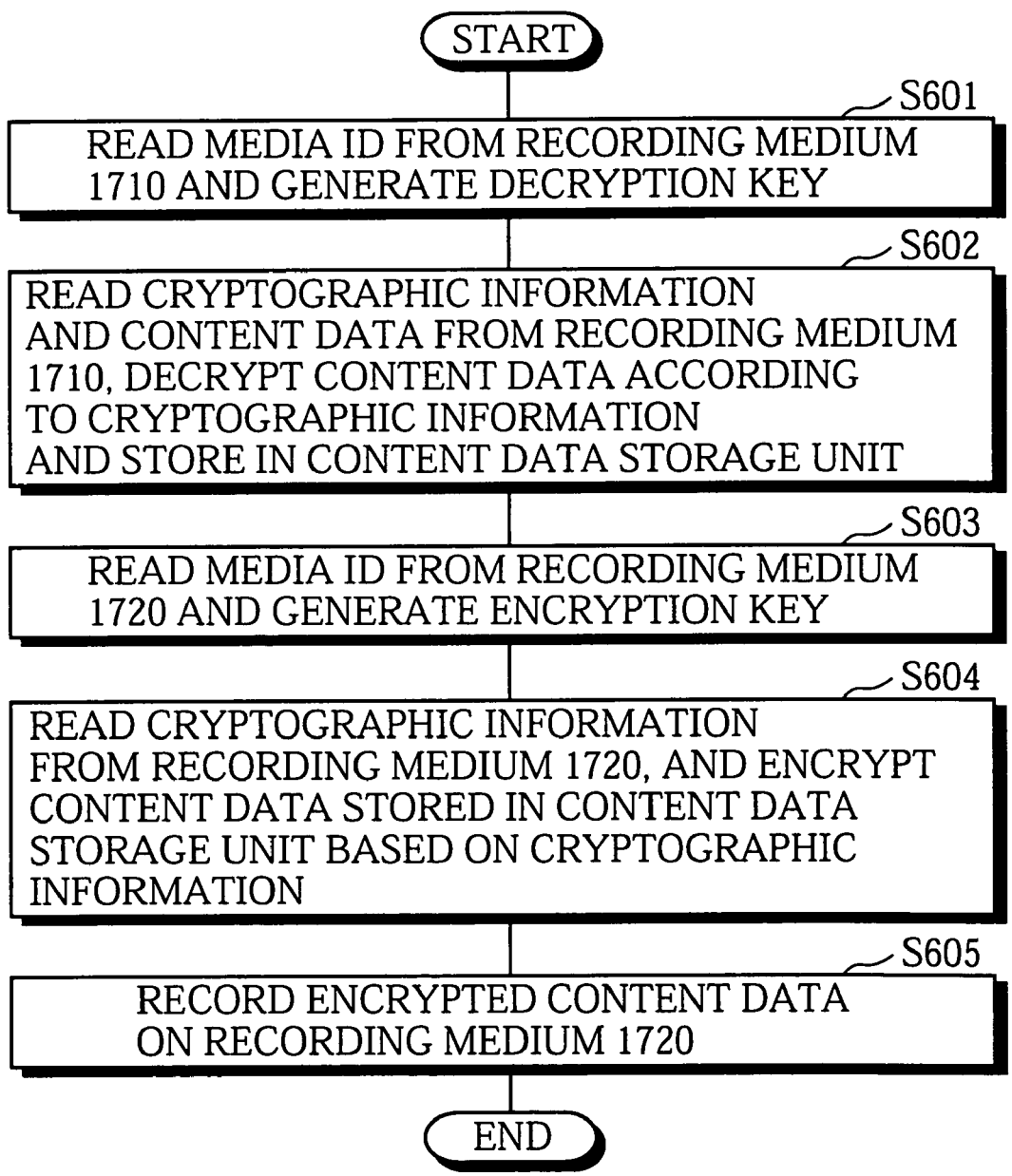
FIG. 14 is a flowchart showing the operation of the cryptographic apparatus 1600.

The following is a description of a cryptographic apparatus in a third embodiment of the invention, with reference to FIGS. 13 and 14.

The cryptographic apparatus in the third embodiment copies content data recorded on a recording medium that has been encrypted using a cryptosystem appropriate to that medium onto another type of recording medium, encrypting the content data using a cryptosystem appropriate to the copy target recording medium when copying is performed. This cryptographic apparatus may be used, for example, to copy content data from DVD (Digital Versatile Disc) onto a magnetic disk or the like.

Construction of Cryptographic Apparatus

FIG. 13 is a block diagram showing a cryptographic apparatus 1600 in the third embodiment of the invention. The drawing also includes two different types of recording medium 1710 and 1720, on which processing is performed by the cryptographic apparatus 1600. Functional components which are identical to those in the first and second embodiments have been given the same numerical references and detailed explanation is omitted here.

A media ID 1711, cryptographic information 1712 and encrypted content data 1713 are recorded on the recording medium 1710. A plurality of content data may be recorded. Here, the media ID 1711 is ID information unique to the recording medium 1710. The cryptographic information 1712 is the same as that described in the second embodiment, but it is based on the particular format of the recording medium 1710, so that it shows the appropriate cryptosystem for any content data that may be recorded on the recording medium 1710.

A media ID 1721 and cryptographic information 1722 are recorded on the recording medium 1720. Here, the media ID 1721 is ID information unique to the recording medium 1720.

The decryption apparatus 1600 reads and decrypts the encrypted content data 1713 recorded on the recording medium 1710, and then encrypts the content data 1713 again using a different cryptosystem, before recording it on the recording medium 1720. In terms of hardware, it is formed from a computer that is provided with a CPU, memory and the like. Functionally, it has a control unit 1610, a header detecting unit 1120, a frame length detecting unit 1130, a decrypting/encrypting unit 1440, a key generating unit 1150, and a content data storage unit 1460. The various functional operations of the cryptographic apparatus 1600 are realized when the CPU executes a control program stored in memory.

Here, the control unit 1610 has a cryptographic information interpreter 1111, a content data obtaining unit 1112, and a content data recording unit 1416. The control unit 1610 controls each part of the cryptographic apparatus 1600, reading the media ID 1711, the cryptographic information 1712 and the content data 1713 from the recording medium 1710, reading the media ID 1721 and the cryptographic information 1722 from the recording medium 1720, and writing the content data on the recording medium 1720.

Construction of Cryptographic Apparatus

The following is an explanation of the operation of a cryptographic apparatus 1600 having the above construction, with reference to FIG. 14.

FIG. 14 is a flowchart showing the operation of the cryptographic apparatus 1600.

First, the control unit 1610 in the cryptographic apparatus 1600 reads the media ID 1711 from the recording medium 1710, and transfers it to the key generating unit 1150, which generates a decryption key (step S601).

Next, the cryptographic information interpreter 1111 reads the cryptographic information 1712 from the recording medium 1710, and the content data obtaining unit 1112 reads the content data 1713 from the recording medium 1710. Then, the cryptographic information interpreter 1111 controls the header detecting unit 1120, the frame length detecting unit 1130 and the encrypting/decrypting unit 1440 based on the read cryptographic information 1712, thereby decrypting the read content data 1713. The encrypting/decrypting unit 1440 then stores the decryption result in the content data storage unit 1460 (step S602). Note that decryption is implemented using the key generated by the key generating unit 1150.

Once the decryption result has been stored in the content data storage unit 1460, the control unit 1610 reads the media ID 1721 from the recording medium 1720 and transfers it to the key generating unit 1150, which generates an encryption key (step S603).

Once the encryption key has been generated, the cryptographic information interpreter 1111 reads the cryptographic information 1722 from the recording medium 1720, and controls the header unit 1120, the frame length detecting unit 1130, and the encrypting/decrypting unit 1440, so as to encrypt the content data 1713 stored in the content data storage unit 1460 (step S604). Encryption is implemented using the key generated by the key generating unit 1150. Once the content data 1713 has been encrypted, the content data recording unit 1416 records the encrypted content data 1713 onto the recording medium 1720 (step S605).

Using this procedure, the cryptographic apparatus 1600 copies encrypted content data from one recording medium to another, and then implements encryption using a cryptosystem appropriate for the copy target recording medium.

Fourth Embodiment

The following is a description of a cryptographic system in a fourth embodiment of the invention, with reference to FIGS. 15 to 31. The cryptographic system in this fourth embodiment includes a transmitter for encrypting and then transmitting content data, and a receiver, for decrypting and using the transmitted content data.

Construction of Cryptographic System

Figure 15:
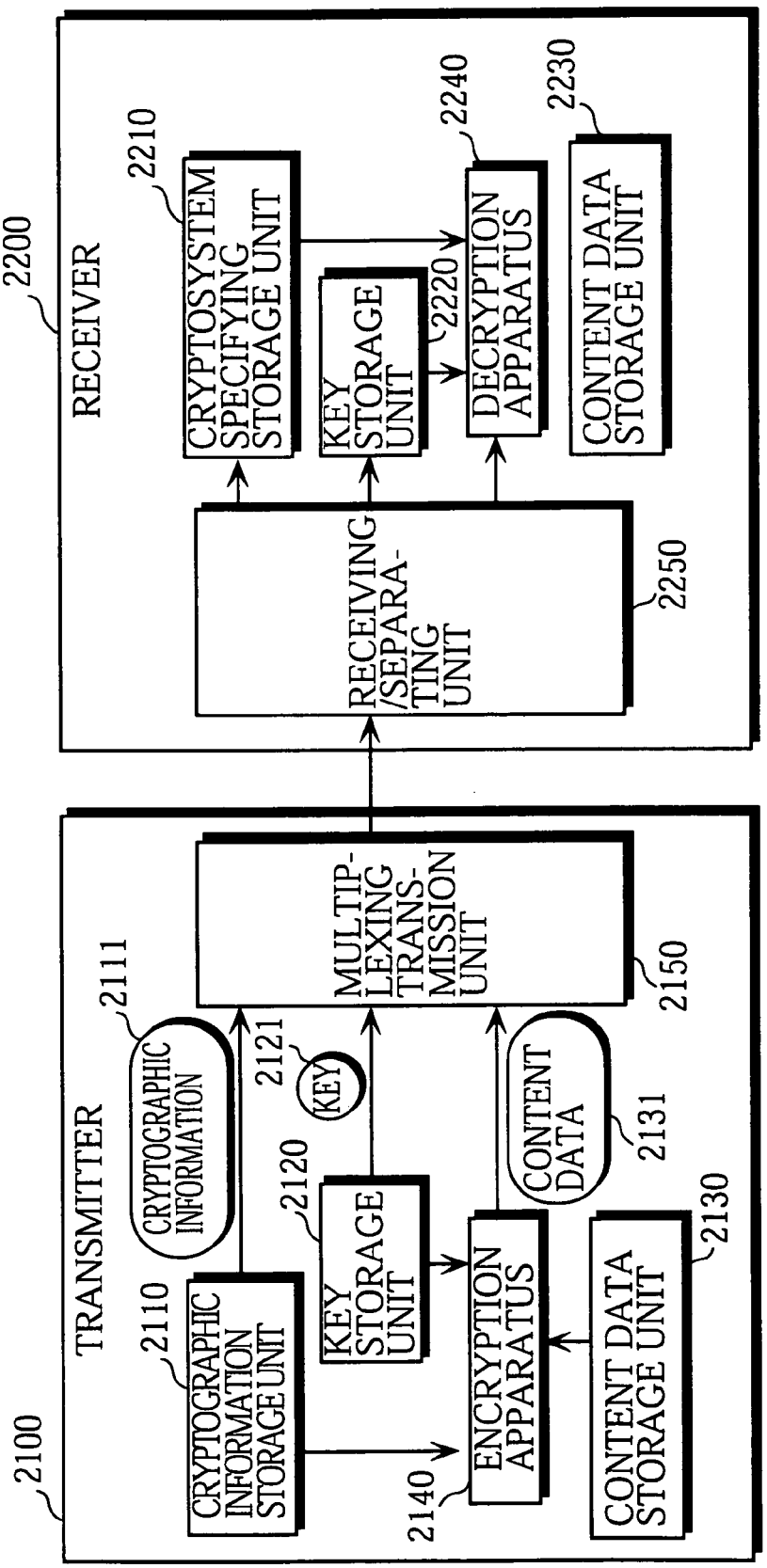
FIG. 15 is a block diagram of a cryptographic system 2000 in a fourth embodiment.

FIG. 15 is a block diagram showing the construction of cryptographic system 2000 in the fourth embodiment.

The cryptographic system 2000 shown in the drawing includes a transmitter 2100, and a receiver 2200. The transmitter 2100 encrypts content data, multiplexes the encrypted content data together with cryptographic information and a key, and transmits the multiplexed data. The receiver 2200 receives the transmitted data, extracts the cryptographic information, the key and the content data from the received data, and decrypts the content data.

The transmitter 2100 may be, for example, a digital broadcast transmitter, provided with such hardware as a CPU, memory and circuitry used for transmission. As functional components the transmitter 2100 includes a cryptographic information storage unit 2110, a key storage key 2120, a content data storage unit 2130, an encryption apparatus 2140 and a multiplexing transmission unit 2150.

Here, the cryptographic information storage unit 2110 is a memory area storing cryptographic information 2111. The cryptographic information 2111 in this fourth embodiment is the same as the cryptographic information shown in the first to third embodiments in specifying a cryptosystem, in other words in specifying the sections of the content data on which cryptographic processing is to be performed and the cryptographic algorithm that is to be used. However, the cryptographic information itself differs from that described in the other embodiments, being made up of instruction descriptors. These differences will be explained in more detail later in the specification.

The key storage unit 2120 is a storage area storing the key 2121 used in cryptography.

The content data storage unit 2130 is a storage area storing content data that is to be transmitted.

The encryption apparatus 2140 receives an input of cryptographic information, a key and content data, and encrypts the content data using the key in accordance with the cryptosystem specified in the cryptographic information.

The multiplexing transmission unit 2150 multiplexes the cryptographic information 2111, the key 2121 and the content data 2131 that has been encrypted by the encryption apparatus 2140 into an MPEG2 transport stream or similar, and transmits the multiplexed data. However, the cryptographic information 2111 (as is explained in detail later in the specification) includes information indicating which of encryption or decryption is to be implemented. Before the cryptographic information 2111 is referred to when encryption is implemented by the encryption apparatus 2140, it contains information indicating encryption. However, once encryption has been implemented, the transmitter 2100 alters the part of the cryptographic information 2111 specifying encryption so that it specifies decryption, and then transmits the cryptographic information 2111.

The receiver 2200 may be, for example, a digital broadcast transmitter, provided with such hardware as a CPU, memory and circuitry used for transmission. As functional components the transmitter 2200 includes a cryptographic information storage unit 2210, a key storage unit 2220, a content data storage unit 2230, a decryption apparatus 2240 and a receiving/separating unit 2250.

Here, the cryptographic information storage unit 2210 is a storage area storing received cryptographic information 2111, and the key storage unit 2220 is a storage area storing a received key 2121.

The content data storage unit 2230 is a storage area storing content data decrypted by the decryption apparatus 2240.

The decryption apparatus 2240 receives cryptographic information 2111, a key 2121 and content data 2131 as input, and decrypts the received content data 2131 using the key 2121, according to the cryptosystem specified in the cryptographic information 2111.

The receiving/separating unit 2250 includes an antenna, a tuner and a transport stream decoder. The receiving/separating unit 2250 receives transmitted data, separates it into the cryptographic information 2111, the key 2121 and the encrypted content data 2131, stores the cryptographic information 2111 in the cryptographic information storage unit 2210, and the key 2121 in the key storage unit 2220, and inputs the content data 2131 into the decryption apparatus 2240.

The following is an explanation of the encryption apparatus 2140 and the decryption apparatus 2240.

Figure 16:
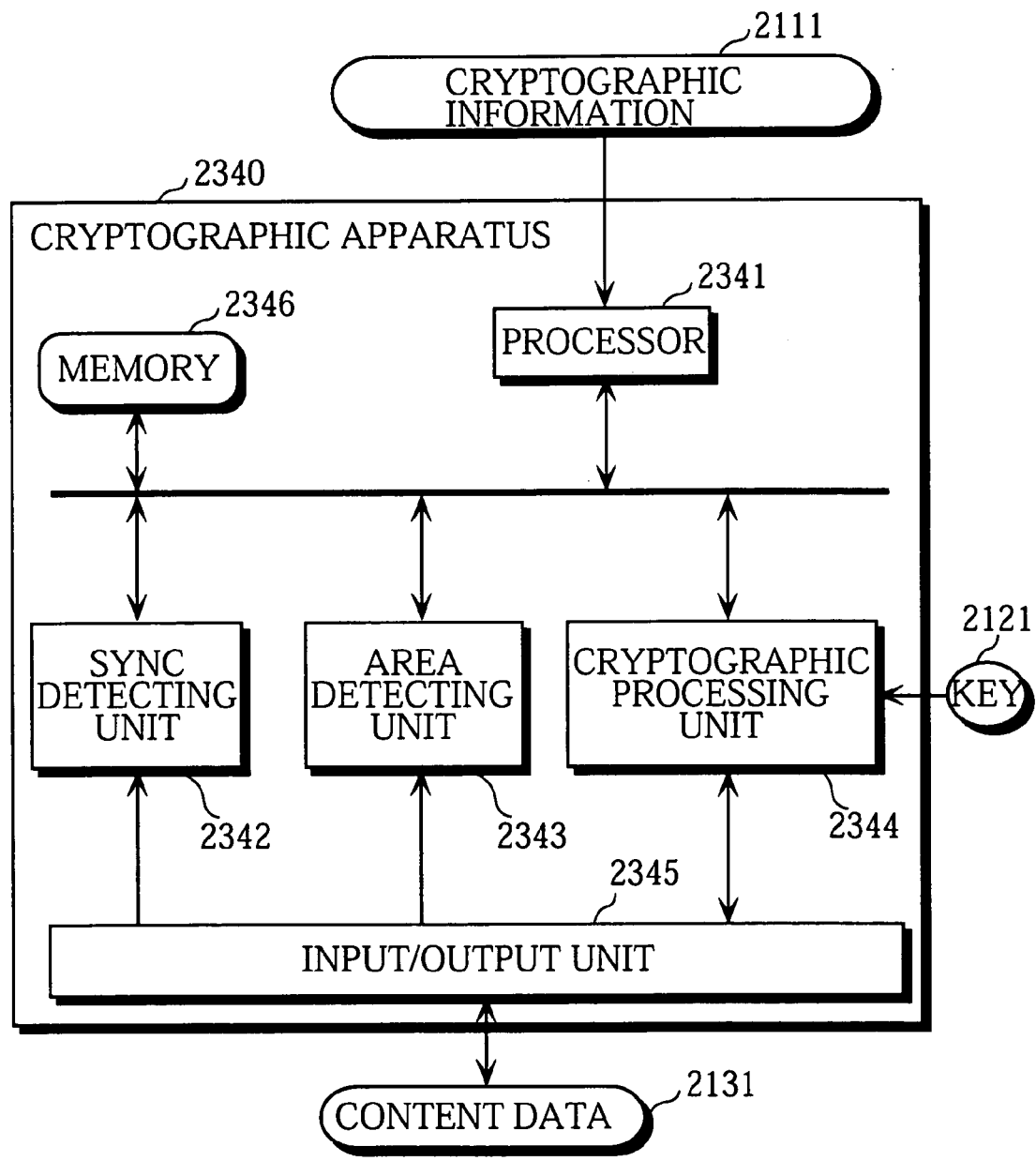
FIG. 16 is a block diagram of a cryptographic apparatus 2340 corresponding to an encryption apparatus 2140 and a decryption apparatus 2240 in the fourth embodiment.

FIG. 16 is a block diagram of a cryptographic apparatus 2340 corresponding to the encryption apparatus 2140 and the decryption apparatus 2240 in the fourth embodiment. The main difference between the encryption apparatus 2140 and the decryption apparatus 2240 is that one implements encryption and the other decryption, but the two apparatuses are otherwise identical. As a result, encryption and decryption are here together described as cryptography, and the operation of both apparatuses is described using a representative cryptographic apparatus 2340.

The cryptographic apparatus 2340 has a processor 2341, a sync detecting unit 2342, an area detecting unit 2343, a cryptographic processing unit 2344, an input/output (hereafter I/O) unit 2345 and a memory 2346.

The processor 2341 is operated according to the instruction descriptors written in the cryptographic information 2111, and controls the other components.

The sync detecting unit 2342 detects a sync pattern from the content data, and stores a base address showing the start point of the sync pattern in the memory 2346, as well as verifying whether the sync pattern is authentic.

The memory detecting unit 2343 calculates the position of the area in the content data that is to undergo cryptography.

The cryptographic processing unit 2344 uses the key 2121 to perform cryptography on the specified area in the content data.

The I/O unit 2345 inputs and outputs content data.

The memory 2346 is the storage area used for receiving and transferring information between the various components.

Cryptographic Information

The following is a description of the cryptographic information 2111.

FIG. 17 shows the descriptors forming the cryptographic information 2111.

The cryptographic information 2111 is formed from four basic instructions. As can be seen from FIG. 17, these are a sync detecting instruction, a sync verifying instruction, a storage area detecting instruction and a cryptographic processing instruction. Instructions supported by a conventional processor, such as a set instruction for setting values and the like in the memory, and a jump instruction for expressing a branch may also be used as structural elements of the cryptographic information 2111. In other words the cryptographic information 2111 is a program formed by combining the four basic instructions with conventional instructions, this program being executed by the processor 2341 in order to control operations performed by the various components of the cryptographic apparatus 2340.

Sync Detecting Instruction

The sync detecting instruction controls the sync detecting unit 2342, instructing it to detect a sync pattern when the content data is constructed from data packets sandwiched between sync patterns, obtain a base address showing the start point of this sync pattern, and record the base address in the memory 2346.

The sync detecting instruction is expressed as the descriptor Sync_detect <end point> <reference address> <sync descriptor information>.

Here, the first and second arguments <end point> and <reference address> are the addresses of storage areas storing the end point and the reference address respectively. The reference address shows the position in the content data at which sync detecting should begin, and is only referred to when the first access of the content data is performed. The end point is not referred to on the first access, but is referred to from the second access onwards, in order to determine a detection start point at which to start detection of the next sync pattern. Thus the end point indicates the position of the next sync pattern.

The third argument <sync descriptor information> is an address of a storage area storing sync descriptor information.

Figure 18:
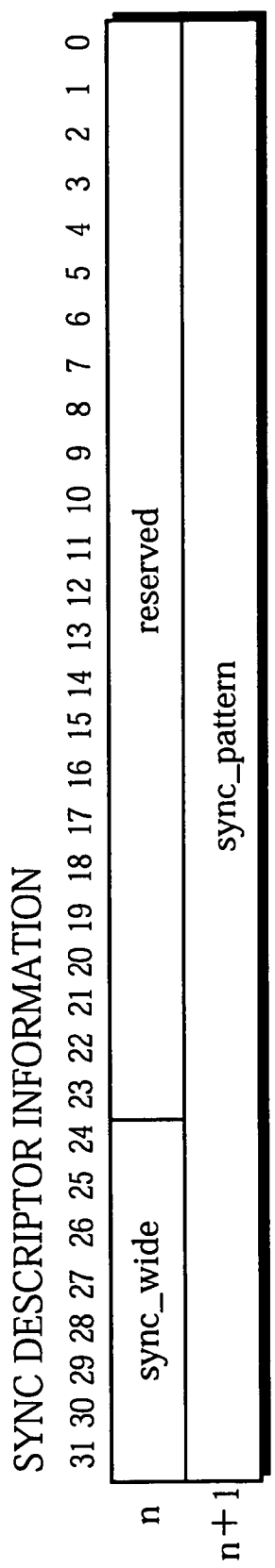
FIG. 18 shows the data construction of sync descriptor information.

FIG. 18 shows the data construction of the sync descriptor information.

As shown in FIG. 18, the sync descriptor information includes an 8-bit sync_wide parameter showing the length of the sync pattern to be detected in the content data, and a 32-bit sync_pattern parameter showing the sync pattern to be detected. When sync_wide is 0, sync_pattern has no significance.

In the drawing, one word is 32 bits, and n and n+1 show addresses. The data shown by reserved in the drawing has no particular significance.

Sync Verifying Instruction

The sync verifying instruction, like the sync detecting instruction, controls the sync detecting unit 2342, instructing it to verify whether a sync pattern detected by the sync detecting instruction is authentic by checking it with the preceding sync pattern, and store a value indicating either TRUE or FALSE in the memory 2346, according to whether the sync pattern is determined to be authentic or not. This instruction is used to verify the result produced by the sync detecting instruction, since the latter instruction may judge that any data having a same bit sequence as the sync pattern is a sync pattern, even if the data concerned is used for a totally different purpose.

The sync verifying instruction is expressed by Sync_check <end point> <reference address> <sync descriptor information>.

Here, the first and second arguments <end point> and <reference address> are the addresses of storage areas storing the end point and the reference address respectively. Here, the end point indicates the end of an interval formed between a base address found when the sync detecting instruction is executed and an estimated position of a next sync pattern. If the sync pattern interval is of a fixed length, then this fixed length may be indicated in the first argument, but if the pattern interval is of a variable length, the area detecting instruction may be used to find the packet end point where the next sync pattern is estimated to be positioned, and this end point is indicated in the first argument. The reference address has the same arguments as its equivalent in the sync detecting instruction.

The third argument <sync descriptor information> is an address corresponding to a storage area storing sync descriptor information. The sync descriptor information is the same as that indicated for the sync detecting instruction.

Area Detecting Instruction

The area detecting instruction controls the area detecting unit 2343, instructing it to detect an area on which cryptographic processing is to be performed from the sections of the content data enclosed by sync patterns, and sets the position of this area in a storage area indicated by an argument.

The area detecting instruction is expressed by the descriptor Area_detect <position> <area descriptor information>.

Here, the first argument <position> is an address of a storage area storing a position obtained as a result of area detecting processing. The second argument <area descriptor information> is an address of a storage area storing area descriptor information.

FIG. 19 shows the data construction of the area descriptor information.

The area descriptor information should be constructed so that it can be used universally to indicate the area on which cryptographic processing is to be performed. As shown in FIG. 19, this information assumes that a code showing the length of a specified area (hereafter referred to as an area length code) is included in the content data, and includes an 8-bit parameter length_wide showing the length of the area length code, a 2-bit parameter length_type showing the format of the area length code, a 3-bit parameter length_unit showing the value of the units used for the area length code, and a 16-bit parameter length_pnt showing a position relative to the base address of the area length code. Note that if length_wide is 0, this indicates that calculation of area length based on the area length code is not performed, and length_type, length_unit and length_pnt are of no significance.

The parameter length_type is information showing whether the area length code is signed or unsigned, and whether the most significant bit or the least significant bit is first. The parameter length_unit expresses the unit of value for the area length code as an exponential value of 2. The reason for expressing the area length code with an exponential value of 2 is that it generally has 1-bit, 8-bit or 32-bit units.

The area descriptor information assumes that a code formed from a specified bit sequence (hereafter referred to as the flag code) is included in the content data. The flag code includes an 3-bit parameter flag_wide showing the length of the flag code, 4-bit parameters flag_pattern1 and flag_pattern2 showing bit patterns for the flag code, and a 16-bit flag_pnt showing a position relative to the base address of the flag code. If flag_wide is 0, this means that the flag code is not checked, and flag_pattern1, flag_pattern2 and flag_pnt have no significance.

Furthermore, the area descriptor information is an incremental value that is added to the length calculated by the area detecting instruction, and includes a 32-bit parameter offset expressed as an integer with attached code. When the length calculated as a result of the area detecting instruction is stored in a storage area as a point, the area descriptor information includes a 1-bit parameter as which indicates whether the calculated length should simply replace the value already stored in the storage area, or whether it should be added to this value. When as is 1 this indicates replacement and 0 indicates addition.

In other words, the area detecting instruction instructs that the flag code be checked based on the area descriptor information, and if the bit pattern matches, calculates the length of the area based on the area length code. The instruction then has the calculated length added to the value set in offset and has the obtained length stored in a storage area as a point based on as.

Therefore, if the area descriptor information includes appropriate data and the area detecting instruction is used one or a plurality of times, an arbitrary position can be found by referencing an arbitrary area length code and arbitrary flag code in the content data.

Cryptographic Processing Instruction

The cryptographic processing instruction controls the cryptographic processing unit 2344, indicating an area on which cryptographic processing is to be performed and a cryptographic algorithm to be used in cryptographic processing and instructing the cryptographic processing unit 2344 to execute cryptographic processing.

The cryptographic instruction is expressed by a descriptor Encrypt <cryptography start point> <cryptography end point> <cryptographic descriptor information>.

Here, a first argument <cryptography start point> and a second argument <cryptography end point> indicate the start and end points of the area on which cryptographic processing is to be performed, and are therefore the addresses of the storage area where the start point and the end point are stored. The third argument <cryptographic descriptor information> is an address of a storage area in which cryptographic descriptor information is stored.

Figure 20:
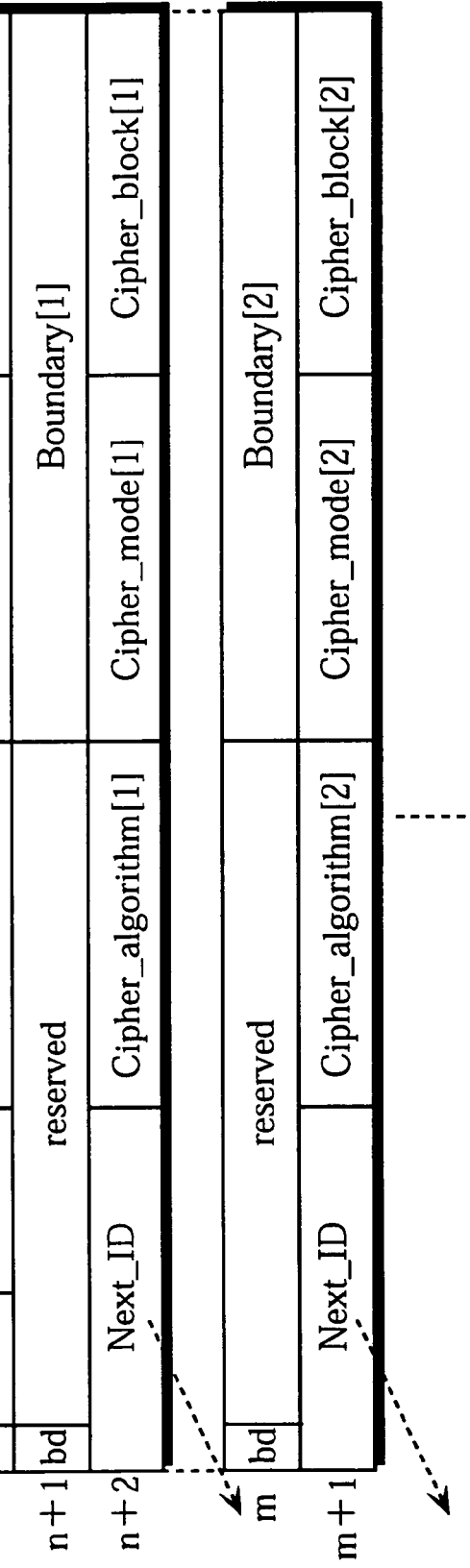
FIG. 20 shows the data construction of cipher descriptor information.

FIG. 20 shows the data construction of the cryptographic descriptor information.

The cryptographic descriptor information includes a 1-bit flag ed showing whether encryption or decryption is to be implemented. The flag ed is 0 when encryption is to be implemented and 1 when decryption is to be implemented.

The cryptographic descriptor information includes an 8-bit parameter Cipher_algorithm[0] showing the algorithm number of the basic algorithm to be used, an 8-bit parameter Cipher_mode[N] showing the cryptographic processing mode that indicating the mode of the basic algorithm that is appropriate in this case, and an 8-bit Cipher_block[0] showing block length, or the basic unit on which cryptographic processing is performed. The cryptographic descriptor information may also include an arbitrary number of option descriptors each indicating alternative cryptographic algorithms. The number of option descriptors is shown by a 3-bit parameter no.

Each option descriptor is constructed from an 8-bit parameter Cipher_algorithm[N] showing the algorithm number of the cryptographic algorithm, an 8-bit parameter Cipher_mode[N] showing the appropriate method for the cryptographic algorithm as a cryptographic mode, an 8-bit Cipher_block showing a block length that forms the basic unit in which cryptographic processing is performed, a 1-bit flag bd[N] showing the direction of the application range covered by the cryptographic algorithm in this option descriptor, a 16-bit Boundary[N] showing the length of the application range of the cryptographic algorithm in this option descriptor and an 8-bit Next_ID showing an address of a storage area storing the next option descriptor after this one. Here, N is 1, 2, and so on, and shows the number of the option descriptor, with 1 being the highest number.

The value of Cipher_algorithm is a number which has been predetermined for the cryptographic algorithm which is to be used. For example, DES may be indicated by the number 0, FEAL by 1, and RSA by 2.

The value of Cipher_mode is a number predetermined for the cryptographic mode that is to be used. For example, ECB is 1, OFB is 2 and CBC is 3.

If bd[N] is set at 0, the algorithm in the option descriptor can be applied forward from the cryptography start point for the range expressed by Boundary[N]. If bd[N] is 1, the algorithm in the option descriptor can be applied backward from the cryptography end point for the range expressed by Boundary[N].

Note, that when determining which cryptographic algorithm should be used for a certain part of the area to be processed, the cryptographic algorithm with the number 1 has the highest priority rating, and the priority rating is lower for lower option numbers, with the basic algorithm having the lowest priority rating of all. In other words the cryptographic algorithms indicated in each option descriptor can be applied within the ranges denoted by Bd[N] and Boundary[N], but if the ranges for a plurality of option descriptors overlap, the cryptographic algorithm indicated as having the highest option descriptor number is given priority.

Figure 21:
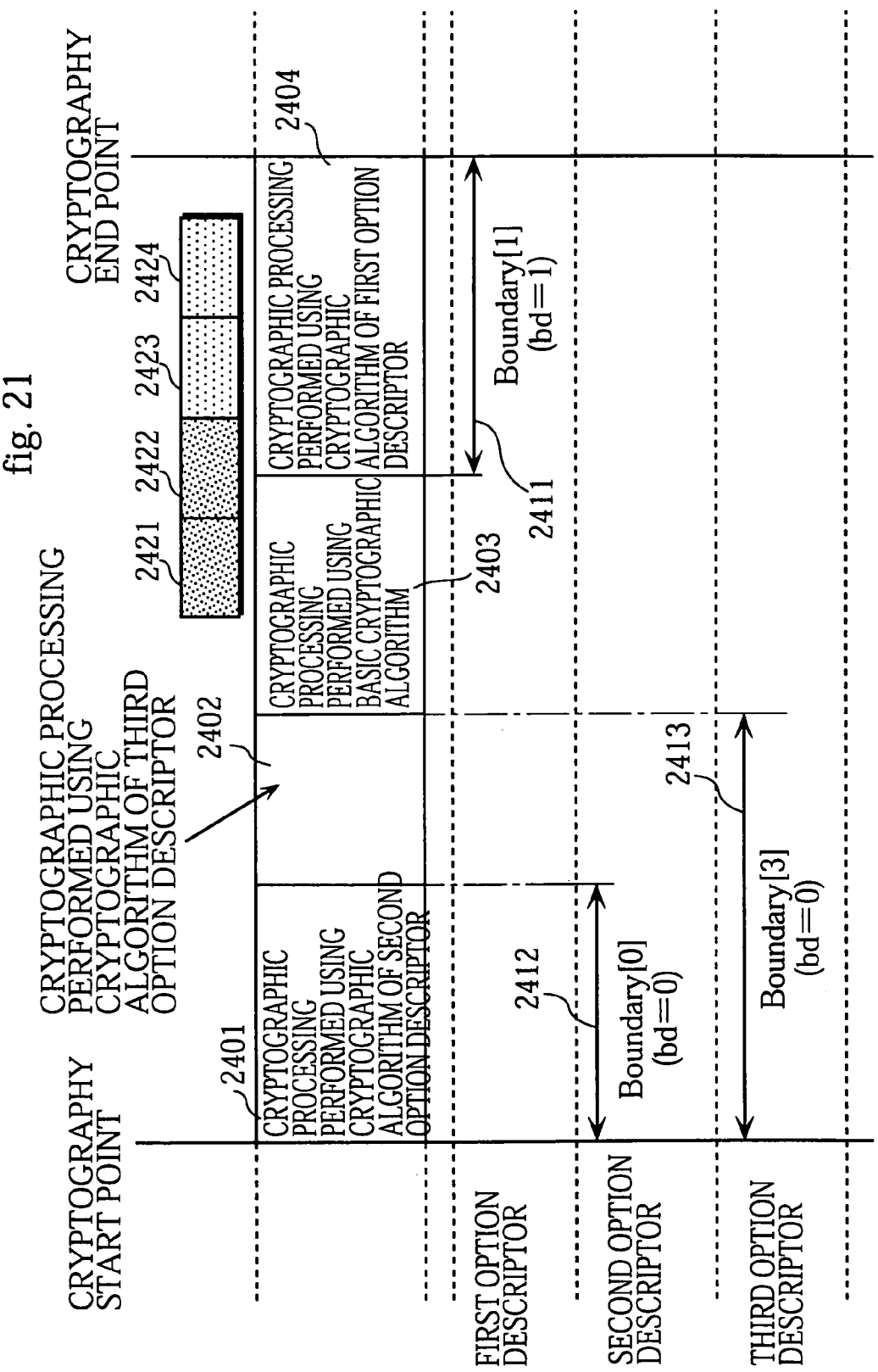
FIG. 21 shows the algorithms used to perform cryptography on the area between the cryptography start point and the cryptography end point.

FIG. 21 is an example showing which cryptographic algorithm implements cryptographic processing for which part of the area between the cryptography start point and the cryptography end point.

In the example shown in FIG. 21, range 2411 is indicated by a first option descriptor, range 2412 is indicated by a second option descriptor, and range 2413 is indicated by a third option descriptor. Here, one part of each of ranges 2412 and 2413 overlaps, but the option descriptor with the higher number is given priority, so that a sub-area 2401 is processed using the cryptographic algorithm from the second option descriptor, a sub-area 2402 is processed using the cryptographic algorithm from the third option descriptor, a sub-area 2403 is processed using the basic cryptographic algorithm and a sub-area 2404 is processed using the cryptographic algorithm from the first option descriptor.

Strictly speaking, processing is performed on block units, so that an algorithm that is applicable to a sub-area containing the start of a block is used for that entire block. One example of this is shown in FIG. 21. Here, blocks 2421 and 2422 are processed using the basic cryptographic algorithm, and blocks 2423 and 2424 using the cryptographic algorithm in the first option descriptor.

Area on which Cryptographic Processing is Performed

Figure 22:
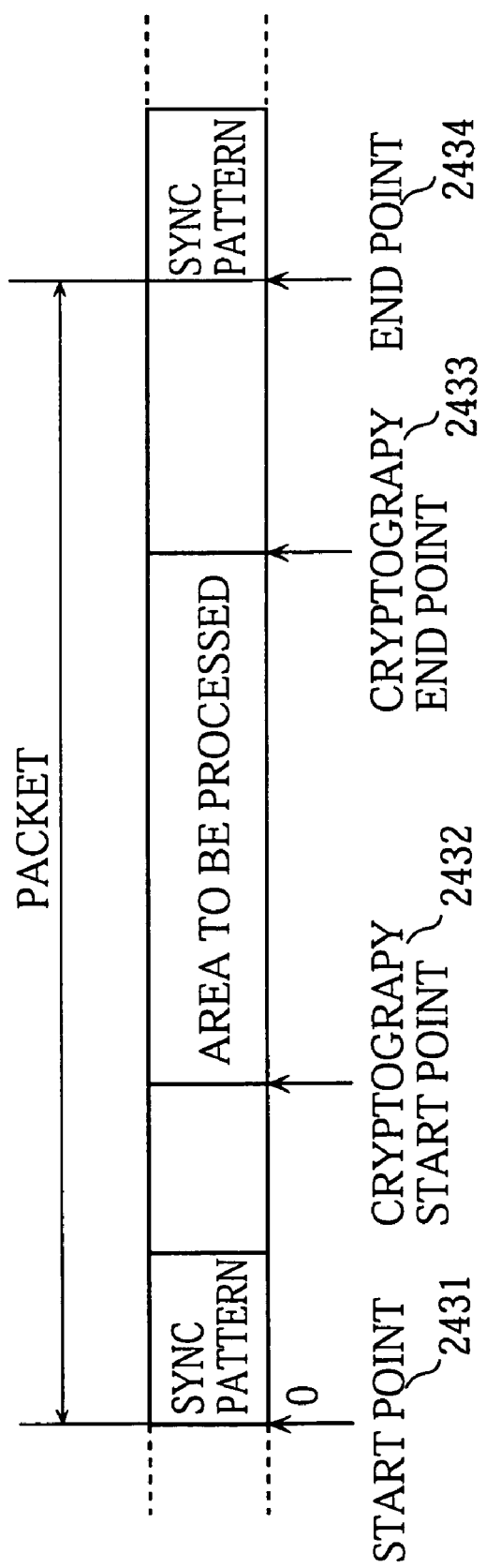
FIG. 22 illustrates an example method specifying an area in the content data that forms the object for the cryptography.

FIG. 22 illustrates an example method for specifying an area in the content data on which cryptographic processing is to be performed.

When the content data is constructed from a plurality of packets, the following operation is performed to specify the area on which cryptographic processed is to be performed. A sync pattern is indicated and the sync pattern detecting instruction executed to find a start point 2431. If the packets are of a predetermined fixed length, an end point 2434 is indicated and the sync verifying instruction executed to verify the accuracy of the start point 2431. Alternatively, if the packets are of a variable length, an area length code showing packet length is indicated and the end point 2434 found using the area detecting instruction, after which the start point 2431 is verified using the sync verifying instruction. If the start point 2431 is found to be inaccurate, a further attempt to find the start point 2431 is made using the sync detecting instruction.

If the start point 2431 is found to be accurate, a cryptography start point 2432 and a cryptography end point 2433 are found, using the area detecting instruction an appropriate number of times if it is necessary to use the area length code included in the content data or check the flag code. Note that if the relative positions of the cryptography start point 2432 and the cryptography end point 2433, based on the start point 2431, are already known, there is no need to use the area detecting instruction to find these two points.

Once the cryptography start point 2432 and the cryptography end point 2433 have been found, the cryptographic processing instruction can be performed using these points as arguments.

The cryptographic information is a program descriptor made up basically of an arbitrary combination of an arbitrary number of sync detecting, sync verifying, area detecting and cryptographic processing instructions.

Operation of Cryptographic System

The following is a description of the operation of the cryptographic system 2000.

Figure 23:
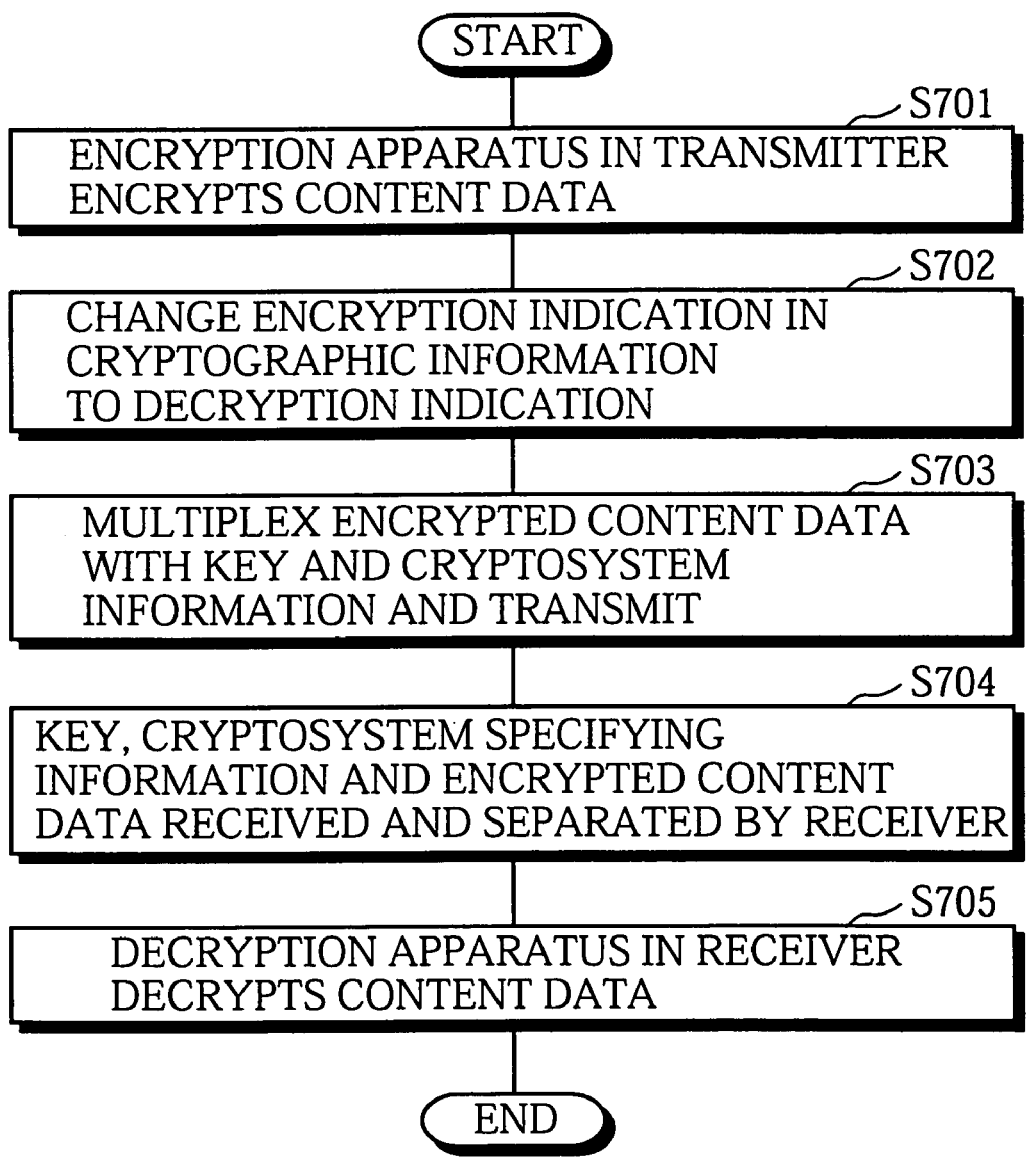
FIG. 23 is a flowchart showing the procedure for communicating content data using the cryptographic system 2000.

FIG. 23 is a flowchart showing a procedure for communicating content data performed by the cryptographic system 2000.

As shown in FIG. 23, the encryption apparatus 2140 in the transmitter 2100 uses the key 2121 stored in the key storage unit 2120 to encrypt the content data 2131 stored in the content data storage unit 2130. This operation is performed based on the cryptographic information 2111 stored in the cryptographic information storage unit 2110 (step S701).

After the content data 2131 has been encrypted, the transmitter 2100 alters the information specifying encryption in the cryptographic information 2111 to information specifying decryption (step S702). This means that the transmitter changes the value ed in the cryptographic processing descriptor, used as an argument for the cryptographic processing instruction, from 0 to 1.

Following this, the multiplexing transmission unit 2150 multiplexes the cryptographic information 2111, the key 2121 and the encrypted content data 2131 and transmits the multiplexed data (step S703).

In response to this, the receiver 2200 receives the transmitted data, separates it into the key 2121, the cryptographic information 2111 and the encrypted content data 2131, stores the key 2121 in the key storage unit 2220 and the cryptographic information 2131 in the cryptographic information storage unit 2210, and inputs the encrypted content data 2131 into the decryption apparatus 2240 (step S704).

Having received the encrypted content data 2131, the decryption apparatus 2240 uses the key 2121 stored in the key storage unit 2220 to decrypt the encrypted content data 2131, and stores the decrypted content data 2131 in the content data storage unit 2230. This operation is performed based on the cryptographic information 2111 stored in the cryptographic information storage unit 2220 (step S705).

Operation of Encryption Apparatus and Decryption Apparatus

The following is a detailed description of the encryption implemented by the encryption apparatus 2140 (step S701) and the decryption implemented by the decryption apparatus 2240 (step S705). Note that the operation of both apparatuses is explained with reference to the cryptographic apparatus 2340 (see FIG. 16).

Figure 24:
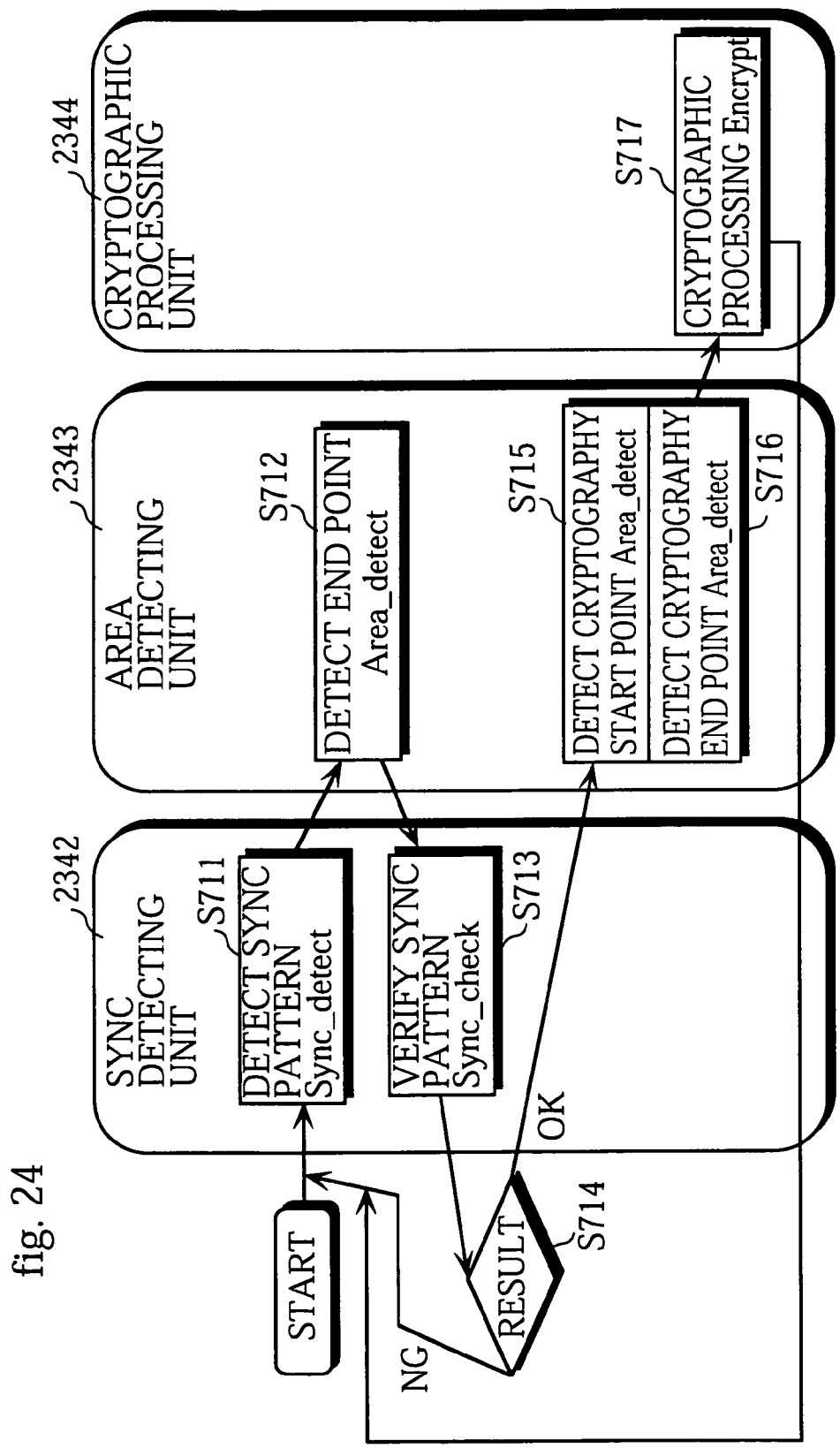
FIG. 24 shows an example operation for a cryptographic apparatus 2340.

FIG. 24 shows an example operation of the cryptographic apparatus 2340.

FIG. 24 shows an example of both the operation flow of the cryptographic apparatus 2340 and an instruction sequence for the cryptographic information. The following description is made with reference to the various points shown in FIG. 22.

First, the sync detecting unit 2342 detects a sync pattern based on the sync detecting instruction Sync_detect (step S711), thereby finding a base address, in other words start point 2431.

Once the sync pattern has been detected, the area detecting unit 2343 detects the end point 2434 based on the area detecting instruction Area_detect (step S712). The end point 2434 is found from area length data extracted from the content data and a predetermined value, according to area descriptor information used as an argument for Area_detect.

Once the end point 2434 has been detected, the sync detecting unit 2342 performs a sync verifying operation to judge whether a next sync pattern exists, based on the sync verifying instruction Sync_check (step S713).

If the result of the sync verification is unsuccessful, in other words if a sync pattern cannot be found at the position shown by the end point (step S714), the sync detecting of step S711 is started again. If the sync verification is successful (step S714), the area detecting unit 2343 detects the cryptography start point 2432 based on the area detecting instruction Area_detect (step S715), and then detects the cryptography end point 2433 based on the area detecting instruction Area_detect (step S716).

Once the cryptography start point 2432 and the cryptography end point 2433 have been detected, the cryptographic processing unit 2344 implements cryptographic processing on the area between the cryptography start point 2432 and the cryptography end point 2433, based on the cryptographic processing instruction encryption (step S717), and returns to the sync detecting operation of step S711 in order to perform cryptographic processing on another area.

The following is a more detailed description of the operations corresponding to each instruction.

Sync Detecting Operation

Figure 25:
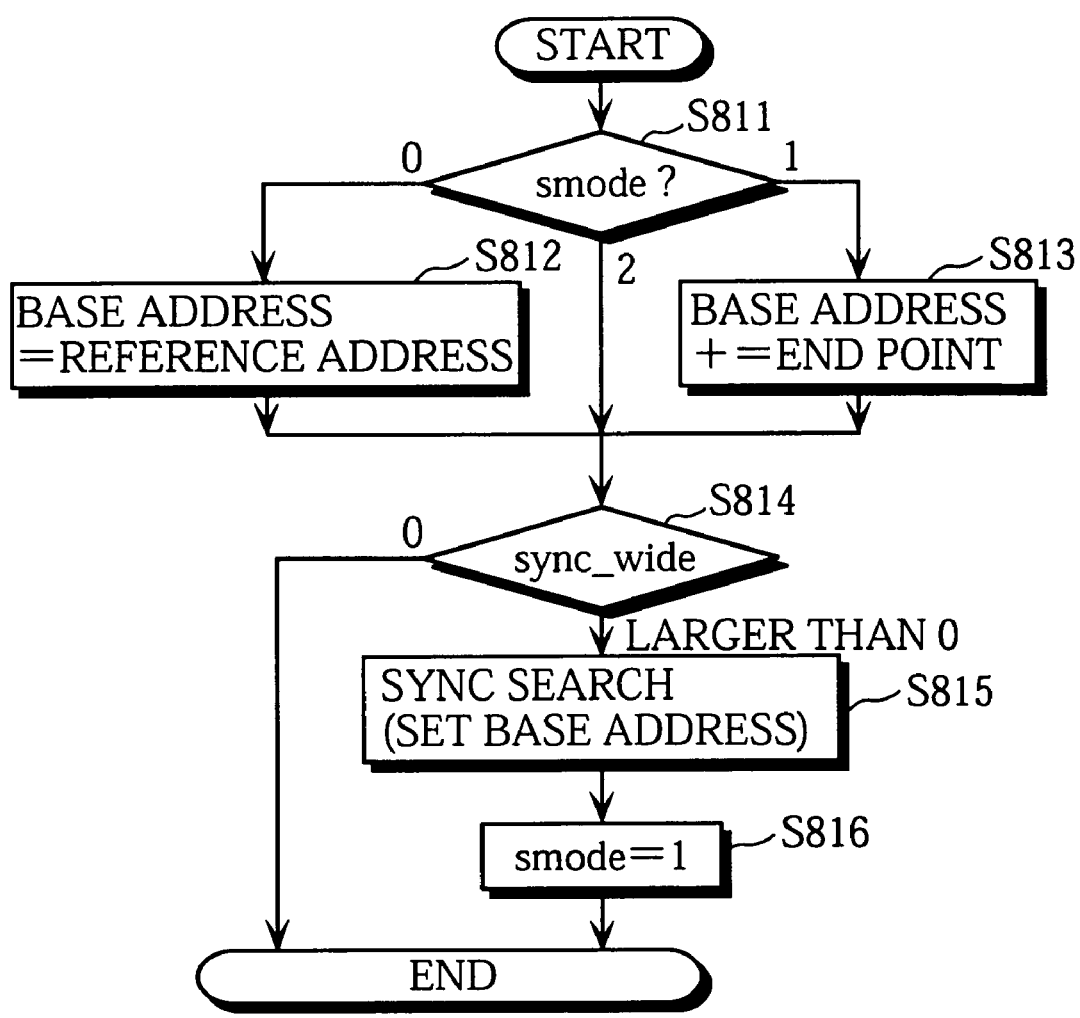
FIG. 25 is a flowchart showing a sync detecting operation performed by a sync detecting unit 2342 based on a sync detecting instruction.

FIG. 25 is a flowchart showing a sync detecting operation performed by the sync detecting unit 2342 based on the sync detecting instruction.

In FIG. 25, the sync detecting unit 2342 first determines the value of smode (step S811), and sets a base address in a memory 2346 according to the determined result. Here, smode is a variable stored in the memory and used to determine the method used by the sync detecting unit 2342 to generate the base address. The variable smode is 0 when the content data is accessed for the first time, and changes to 1 after that. If the base address has already been set and there is no need to set it again, as is the case when an error occurs, smode is set at 2.

The sync detecting unit 2342 replaces the base address with the reference address that is an argument to the sync detecting instruction, if smode is 0 (step S812), sets a value which is the result of adding the end point that is an argument for the sync detecting instruction to the original base address, if smode is 1 (step S813), and judges whether sync_wide in the sync descriptor information is 0 without setting the base address, if smode is 2 (step S814).

If sync_wide is 0 (step S814), the sync detecting unit 2342 performs a sync search, for a sync pattern with the number of bits shown in sync_wide and the same bit sequence as that in sync_pattern. The search is performed by moving the search point back one bit at a time, starting from the current base address (step S815). Then, the sync detecting unit 2342 sets smode at 1 (step S816), and ends the sync detecting operation. To give a specific example of such an operation, when sync_wide is 12 and sync_pattern is 0xFFF, the sync detecting unit 2342 searching for a sync pattern that is the first bit sequence to match 0xFFF. Note that in step S815, the position of the first bit of the searched sync pattern is set as a new base address. If the sync pattern matches at the current base address, the base address is not changed.

When sync_wide is 0 (step S814), the sync detecting unit 2342 ends the sync detecting operation.

Sync Verifying Operation

Figure 26:
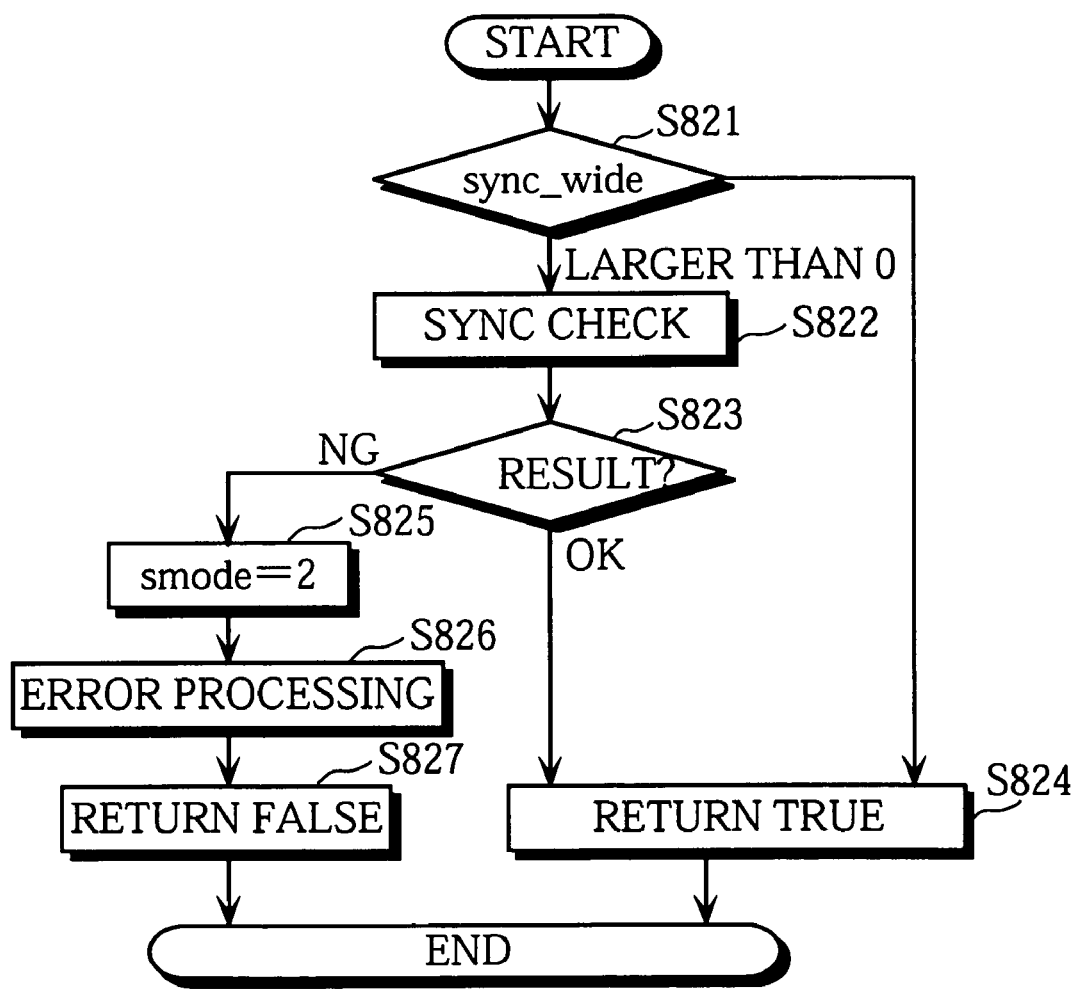
FIG. 26 is a flowchart showing a sync verifying operation performed by the sync detecting unit 2342 based on a sync verifying instruction.

FIG. 26 is a flowchart showing a sync verifying operation based on the sync verifying instruction performed by the sync detecting unit 2342.

In FIG. 26, the sync detecting unit 2342 first determines whether sync_wide is 0 (step S821). If it is 0, the sync detecting unit 2342 sets a return value, signifying that the sync pattern is genuine, in the memory 2346 and ends the sync verifying operation (step S824).

If sync_wide is not 0 at step S821, the sync detecting unit 2342 performs a sync check (step S822). The sync check determines whether the data between the base address and the end point indicated as an argument to the sync detecting instruction, in other words the data of the base address+end point, matches the pattern shown in sync_pattern. If the pattern matches, the sync detecting unit 2342 moves to the OK branch of step S823, sets a return value meaning TRUE in the memory 2346 and ends the sync verifying operation (step S824). If the pattern does not match, the sync detecting unit 2342 moves to the NG (no good) branch at step S823, sets smode at 2 (step S825) and performs error processing (step S826). Then the sync detecting unit 2342 sets a return value meaning FALSE in the memory 2346 and ends the sync verifying operation (step S827).

The error processing of step S826 includes notifying other processing components by means of an interrupt or other method that an error has occurred, and changing the base address by adding 1 or similar.

Area Detecting Operation

Figure 27:
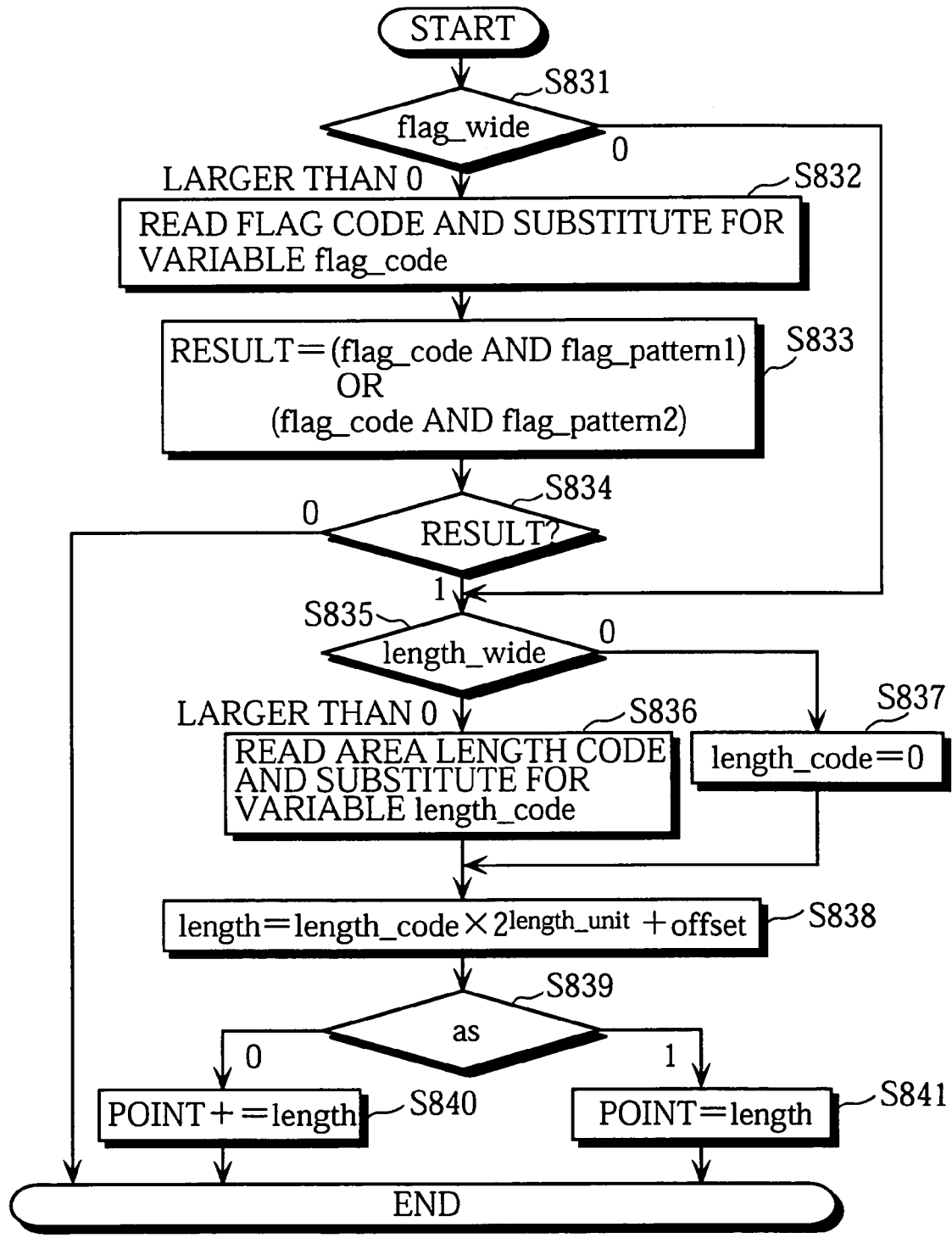
FIG. 27 is a flowchart showing an area detecting operation performed by an area detecting unit 2343 based on an area detecting instruction.

FIG. 27 is a flowchart showing an area detecting operation performed by the area detecting unit 2343.

In FIG. 27, the area detecting unit 2343 first determines whether flag_wide is 0 by referring to the area descriptor information that is an argument for the area detecting instruction (step S831). If flag_wide is 0, the area detecting unit 2343 skips the processing in steps S832 to S834.

If flag_wide is not 0 at step S831, the area detecting unit 2343 reads a flag code having the number of bits shown in flag_wide from a position in the content data shown by the base address+flag_pnt, and sets it in the variable flag_code (step S832). Here, the variable flag_code is a storage area in the memory 2346 holding the flag code from the content data.

Once the flag code has been set in the variable flag_code, the area detecting unit 2343 determines whether flag_code and flag_pattern1 or flag_code and flag_pattern2 match (steps S833, S834). If flag_code does not match either of flag_pattern1 or flag_pattern2, the area detecting unit 2343 ends the area detecting operation. If flag_code matches one of flag_pattern1 or flag_pattern2, however, the area detecting unit 2343 determines whether length_wide is 0 (step S835).

If length_wide is 0 at step S835, the area detecting unit 2343 reads an area length code having the number of bits shown in length_wide from a position in the content data shown by the base address+length_pnt, and sets it in the variable length_code (step S836). Here, the variable length_code is a storage area in the memory 2346 holding the area length code from the content data. Furthermore, when length_wide is determined to be 0, the area detecting unit 2343 sets the variable length_code at 0 (step S837).

After performing the processing of steps S836 and S837, the area detecting unit 2343 sets the variable length_code×(2 to the power of length_unit)+offset in the variable length (step S838). Here, the variable length is a storage area in the memory 2346.

After performing the processing for step S838, the area detecting unit 2343 determines whether as is 0 (step S839). If as is 0, the area detecting unit 2343 adds the variable length to a point showing a position indicated by an address that is an argument to the area detecting instruction (step S840). If as is 1, the area detecting unit 2343 sets the value of the variable length at the position indicated by the address that is the argument to the area detecting instruction, and ends the area detecting operation.

Cryptographic Processing Operation

Figure 28:
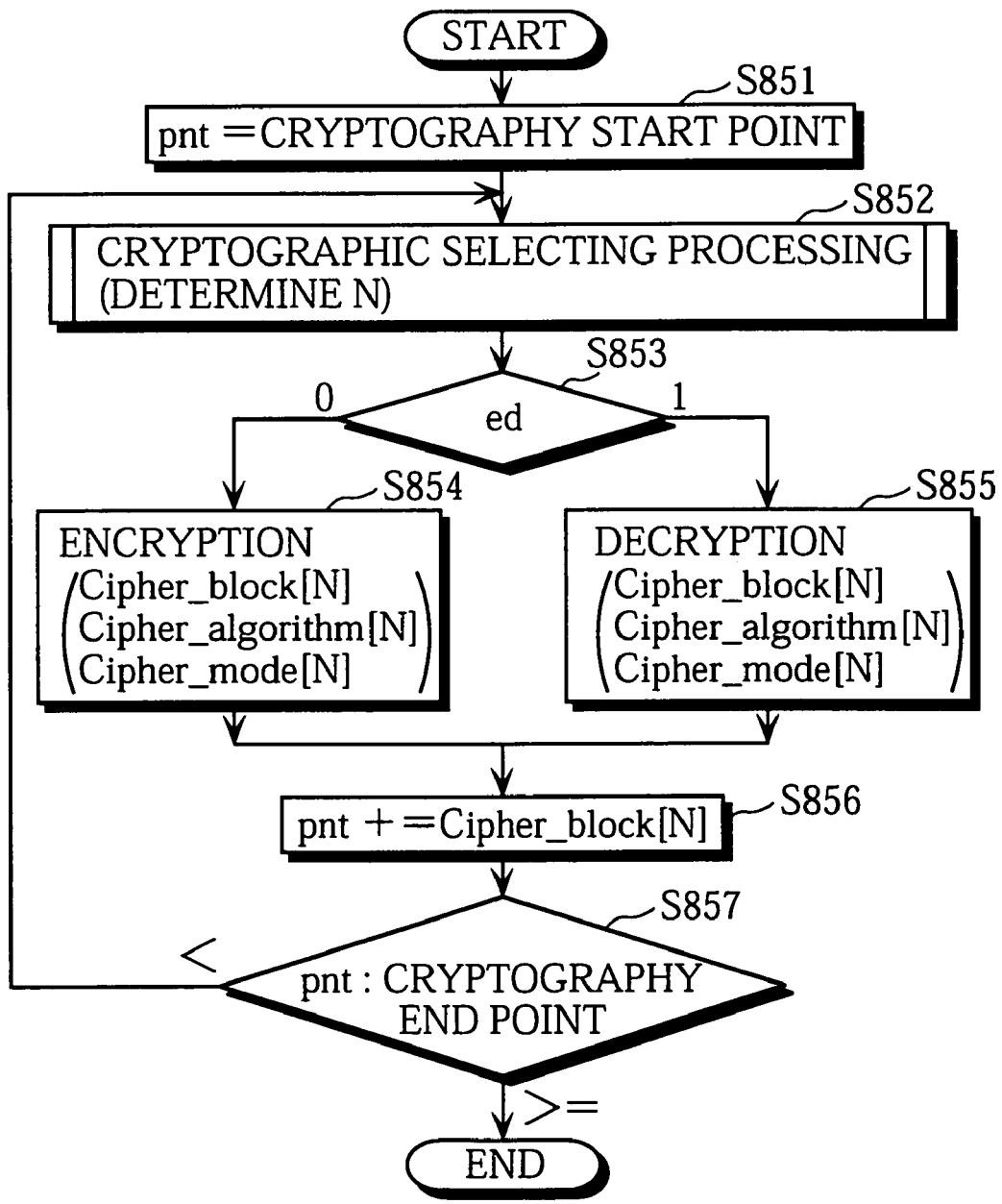
FIG. 28 is a flowchart showing a cryptographic operation performed by a cryptographic processing unit 2344 based on a cryptographic instruction.

FIG. 28 is a flowchart showing a cryptographic processing operation based on the cryptographic processing instruction performed by the cryptographic processing unit 2344.

In FIG. 28, the cryptographic processing unit 2344 first replaces the current value of a variable pnt with a cryptography start point that is an argument to the cryptographic processing instruction (step S851). Here, the variable pnt expresses a current position, and is a storage area in the memory 2346.

After replacing the variable pnt with the cryptography start point, the cryptographic processing unit 2344 executes cryptographic selecting processing to select the appropriate cryptographic algorithm for performing the cryptographic processing (step S852). This processing determines the value of N. The basic cryptographic algorithm is represented by setting N at 0, while in the case of other cryptographic algorithms, N represents the order of the option descriptor. The cryptographic selecting processing is explained in detail later in the specification.

After executing cryptographic selecting processing, the cryptographic processing unit 2344 determines whether the value of ed in the cryptographic processing descriptor that is an argument to the cryptographic processing instruction is 0 or 1 (step S853). If ed is 0, the cryptographic processing unit encrypts the number of blocks of content data indicated by Cipher_block[N], starting from a point shown by the variable pnt. This encryption is implemented using the cryptographic algorithm shown by Cipher_algorithm[N] in the cryptographic processing mode shown by Cipher_mode[N] (step S854). If ed is 1, the cryptographic processing unit 2344 decrypts the number of blocks of content data indicated by Cipher_block[N], starting from a point shown by the variable pnt. This decryption is implemented using the cryptographic algorithm shown by Cipher_algorithm[N] in the cryptographic processing mode shown by Cipher_mode[N] (step S855).

After implementing the encryption of step S854 or the decryption of step S855, the cryptographic processing unit 2344 adds Cipher_block[N] to the variable pnt (step S856), and determines whether the variable pnt is smaller than the cryptography end point that is an argument to the cryptographic processing instruction (step S857).

If the variable pnt is determined to be smaller than the cryptography end point, the cryptographic processing unit 2344 returns once more to step S852, and if the variable pnt is determined to be larger than the cryptography end point, the cryptographic processing unit ends the cryptographic processing.

The following is an explanation of the cryptographic selecting processing.

Figure 29:
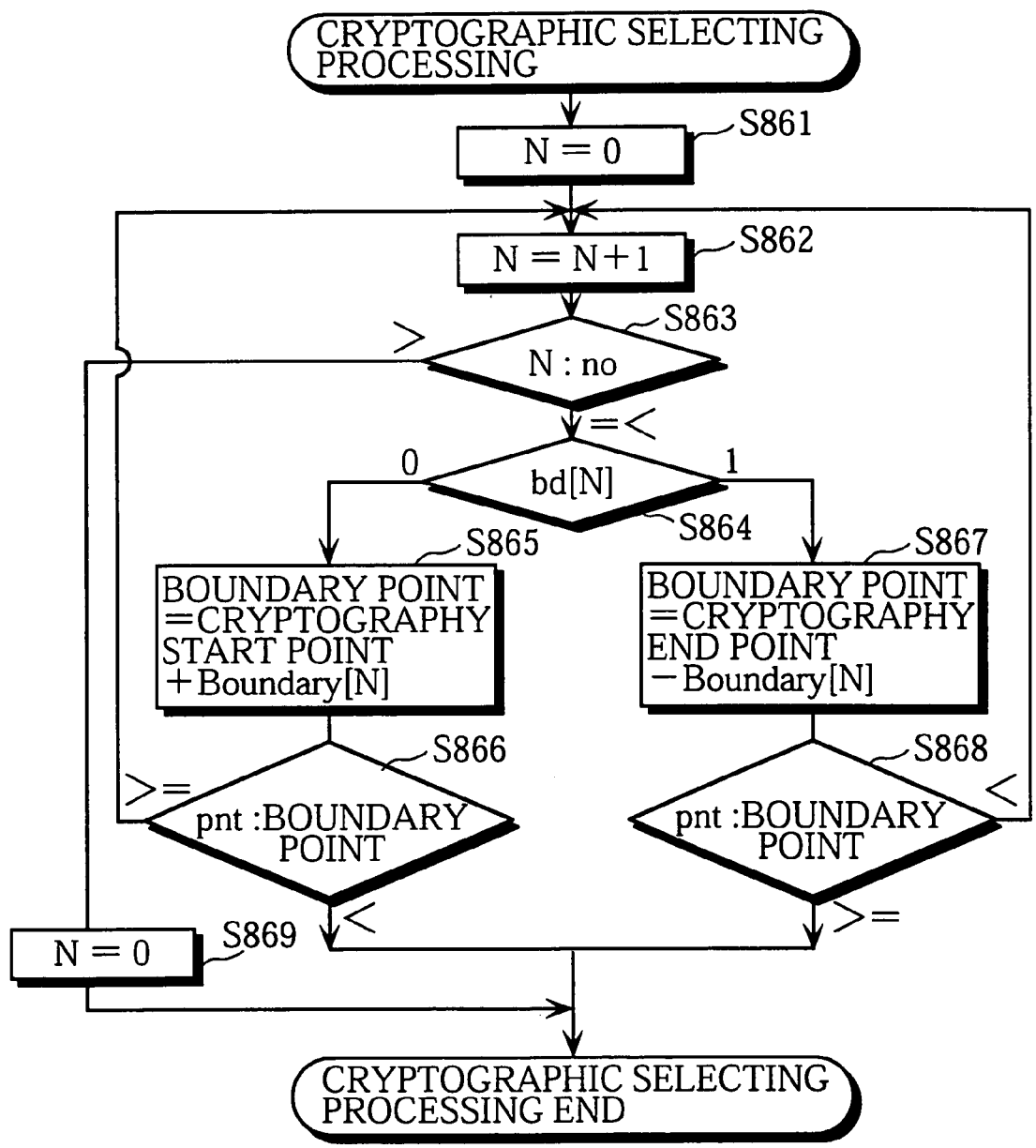
FIG. 29 is a flowchart showing cryptographic selecting processing performed by the cryptographic processing unit 2344 based on a cipher selection instruction.

FIG. 29 is a flowchart showing the cryptographic selecting processing performed by the cryptographic processing unit 2344.

In the cryptographic selecting processing, the cryptographic processing unit 2344 first sets the variable N at 0 (step S861), and then adds 1 to the variable N (step S862), Here, the variable N is a storage area in the memory 2346. Following this, the cryptographic processing unit 2344 compares the variable N with no in the cryptographic processing descriptor (step S863). If N exceeds no, this means that the basic cryptographic algorithm should be used, and the cryptographic processing unit 2344 sets the variable N at 0 (step S869), and ends the cryptographic selecting processing. If, however, N does not exceed no, the cryptographic processing unit 2344 determines the value of bd[N] in the Nth option descriptor (step S864).

If bd[N] is determined to be 0 at step S864, the cryptographic processing unit 2344 replaces a variable showing a boundary point with the sum of the cryptography end point and Boundary[N] (step S865), and compares the variable pnt with the value of a variable showing the boundary point (step S866). If the variable pnt does not exceed the variable showing the boundary point at S866, the cryptographic processing unit 2344 ends the cryptographic processing, and if the variable pnt is at least as large as the value of the variable showing the boundary point, the cryptographic processing unit 2344 returns to the processing of step S862.

If bd[N] is determined to be 1, the cryptographic processing unit 2344 substitutes a value obtained by subtracting Boundary[N] from the cryptography end point for the variable showing the boundary point (step S867), and compares the variable pnt with the value of a variable showing the boundary point (step S868). If the variable pnt is at least as large as the variable showing the boundary point at S866, the cryptographic processing unit 2344 ends the cryptographic processing, and if the variable pnt does not exceed the value of the variable showing the boundary point, the cryptographic processing unit 2344 returns to the processing of step S862.

By performing the above procedure, the cryptographic processing unit 2344 performs cryptographic processing on an area in the content data between the cryptography start point and the cryptography end point.

Actual Example

The following is an explanation of the operation of the cryptographic apparatus 2340 (previously explained with reference to FIG. 24), using a more realistic example of content data and cryptographic information.

FIG. 30 shows the construction of a stream that is an example of content data 2131 input into the cryptographic apparatus 2340.

The stream shown in the drawing has a sync pattern expressed in hexadecimal notation using an 0xfff bit sequence, and an area length code is embedded in the sync pattern for 13 bits, starting from the 31st bit. This area length code shows the length of the packet, in other words the number of bytes from the first bit of the sync pattern to the last bit in the packet.

In each packet of this stream, an area from the last bit of the area length code to the last bit of the packet is the area on which cryptographic processing is performed. If the first point of the sync pattern is the base address, the end point and the cryptography end point are a point that is (the area length code×8) bits from the base address, and the cryptography start point is 43 bits from the base address.

FIG. 31 shows an example of the cryptographic information 2111 input into the cryptographic apparatus 2340 for processing the stream shown in FIG. 30. In this example, the cryptographic information is constructed from descriptors 901 to 909. Note that the area descriptor information shown in the drawing is shown with part of its parameters omitted.

Here, the addresses in the memory storing the data for each of the base address, the reference address, the end point, the cryptography start point, and the cryptography end point are shown as #0, #1, #2, #3 and #4 respectively. Furthermore, the descriptor 901 is a label that forms a jump target for a branch instruction. Descriptor 905 is a branch instruction for branching to descriptor 901 in response to a value of a flag register set as a result of executing an instruction. The descriptor 905 branches to an instruction showing the label when the result of the verification performed by the sync verifying instruction is negative. The descriptor 909 is a branch instruction that branches to the instruction showing the label, thereby forming a processing loop. If the sync detecting instruction does not detect a sync pattern, processing is ended without performing this processing loop.

The cryptographic apparatus 2340 first detects from the stream a sync pattern formed from a 12-bit 0xfff bit sequence, in accordance with the sync detecting instruction of descriptor 902, and then sets the first bit of the sync pattern as base address #0. Note that when data in the stream is detected for the first time, detection starts from the reference address #1, and when detection is performed for a second time onwards detection starts from the end point #2 of the foremost packet.

Next, the cryptographic apparatus 2340 detects a 13-bit area length code from the 31st bit, using the base address as a reference, and according to the area detecting instruction of descriptor 903. Then the cryptographic apparatus 2340 reads the value of the area length code as an unsigned most significant bit header, multiplies this value by 2 to the power of length_unit, and sets this value as the end point #2.

The cryptographic apparatus 2340 determines whether a sync pattern formed from a 12-bit 0xfff bit sequence is at the end point, according to the sync verifying instruction of descriptor 904. If there is no sync pattern, the cryptographic apparatus 2340 sets the flag register at a value other than 0, but if there is a sync pattern the cryptographic apparatus 2340 sets the flag register at 0. If the flag register is not 0, the cryptographic apparatus 2340 repeats the processing in the sync verifying instruction indicated by LABEL1, according to the branch instruction of descriptor 905.

If the flag register is set at 0 as a result of the processing of descriptor 905, the cryptographic apparatus 2340 sets a 43rd bit from the base address as the cryptography start point #3 in accordance with the area detecting instruction of descriptor 906.

Next, the cryptographic apparatus 2340 detects a 13-bit area length code starting from the 31st bit using the base address as a reference. The cryptographic apparatus 2340 then reads the value of the area length code as an unsigned most significant bit header, multiplies this value with 2 to the power of length_unit, in other words by 8, and sets the resulting value as the cryptography end point #4. This processing is performed in accordance with the area detecting instruction of descriptor 907.

The cryptographic apparatus 2340 specifies an area between the cryptography start point #3 and the cryptography end point #4 as that on which cryptographic processing is to be performed. Then the cryptographic apparatus 2340 performs cryptographic processing on this area. This processing is basically performed on 8-byte units using the DES algorithm in CBC mode. When the remaining data is less than 8 bytes, processing is performed using the DES algorithm in OFB mode.

The cryptographic apparatus 2340 repeats the processing of descriptors 902 to 908 according to the branch instruction of descriptor 909.

Furthermore, for each packet, the cryptographic apparatus 2340 detects a sync pattern according to descriptor 902, detects an end point according to descriptor 903, verifies a sync pattern according to descriptor 904, detects a cryptography start point according to descriptor 906, detects a cryptography end point according to descriptor 907, and performs cryptographic processing according to descriptor 908.

This operation enables the cryptographic apparatus 2340 to implement the appropriate cryptographic processing on the stream shown in FIG. 30.

Supplementary Information

The invention has been described with reference to the above first to fourth embodiments, but it need not be limited to the description contained therein. Possible alternatives are as follows:

1. In the first to fourth embodiments, the header detecting unit, frame length detecting unit, decrypting unit, encrypting unit, encrypting/decrypting unit, sync detecting unit, area detecting unit, and cryptographic detecting unit are realized using software, but these functions may alternately be realized by specialist hardware circuitry.

2. The cryptographic information in the first and fourth embodiments need not include information showing encryption and decryption separately. Instead, it is possible to predetermine which of encryption and decryption is implemented by the cryptographic apparatus. In this case, for example, the encrypting function and the decrypting function may be combined, so that there is no need to switch between encryption and decryption in step S316, and the processing of step S702 is no longer required. Note, the predetermination of either encryption or decryption may be indicated by a user.

3. The cryptographic information need only be a combination of an arbitrary number of functions and instructions for controlling the operation of the cryptographic apparatus. It may be written in a high-level programming language such as C, or in a more compact byte code, machine language or the like. Operation of the cryptographic apparatus may be indicated using descriptors written in a specified language or by groups of constant values. However, it is advantageous to indicate operation of the cryptographic apparatus using groups of constant values since this allows a variety of operation controls to be performed in response to the actual composition of the content data. Furthermore, instructions such as the sync detecting instruction and the cryptographic processing instruction may be of variable or fixed length, and written using any kind of symbolic convention. Consequently, the cryptographic apparatus should be capable of operating based on any such cryptographic information.

Correspondingly, the arguments for each instruction may be symbolic conventions such as memory addresses or register IDs, provided that they indicate the content of the content data. In fact, since what is essential is that the content data may be used by the cryptographic apparatus, arguments may not be necessary at all. Furthermore, the data construction of the sync descriptor information, the area descriptor information and the cryptographic descriptor may be of any kind, and length_unit in the area descriptor information, described as an exponential value expressing the unit value of the area length code as an exponent of 2 in the embodiments, may be a different numerical value.

Furthermore, the area detecting instruction may be separated into a plurality of instructions such as an instruction for checking the flag code in the content data and an instruction for obtaining the area length code and calculating the length of the area.

The cryptographic information 1111 need not be an interpreter. Alternatively, it may be a compiler that first converts the cryptographic information into machine language and then executes it or, if the cryptographic information is itself written in machine language, a processor. If the cryptographic information is written in a high-level programming language, a compiler or similar is located in front of the processor 2341 in the processing order. The sync detecting instruction, sync verifying instruction, area detecting instruction, and cryptographic processing instruction may be converted into a machine language instruction sequence by the compiler, the machine language instruction sequence then being executed by the processor 2341.

Note that the operations and cryptographic information relating to the cryptographic processing in any of the first to four embodiments are interchangeable.

4. The file type is described as being a file extension in the second embodiment, but any information that shows the type of the file may be used. The type-specific cryptographic information 1531 need not include cryptographic information for all of the file types relating to the files stored on the IC card 1500, provided that cryptographic information for at least one file type is included. Furthermore, the file name is described as being transmitted from the cryptographic apparatus 1400, while cryptographic information corresponding to the file type for that file is received from the IC card 1500. However, strictly speaking the cryptographic apparatus 1400 need only receive information showing the file name to be able to receive the cryptographic information.

Furthermore, in the embodiments the cryptographic information for each file type is constructed as an individual file, but the type-specific cryptographic information may alternatively be information containing a linked file type and a file name or similar for specifying a file containing the cryptographic information to be used with the content data for this file type.

The medium used to store the specialist cryptographic information and content data files need not be limited to a recording medium to which an active element has been added, such as the IC card 1500, but may also be a recording medium without an added active element, such as a magnetic disk. In this case, the cryptographic information interpreter 1111 in the cryptographic apparatus 1400 may refer to specialist cryptographic information on the recording medium, thereby reading the cryptographic information appropriate to the file type and performing control of the encrypting/decrypting unit 1440 and the like based on the obtained cryptographic information. The IC card shown in the first and third embodiments may also be replaced by a recording medium without an added active element.

Note that the recording medium storing the content data processed by the cryptographic apparatus is portable. The reason for this is that content data is recorded on such a recording medium for distribution and the encryption implemented by the cryptographic apparatus protects the data during the distribution process.

5. Generation of the cryptographic key by the key generating unit 1150 in the first to third embodiments does not have to be performed based on the media ID. The key generating unit 1150 may, for example, obtain information forming the basic for a key or the key itself via user input. Furthermore, the key generating unit 1150 shown in the second embodiment may use an encrypting key formed from a random number that varies according to file type, as the basis for generating an encryption key, in addition to the media ID. This encrypting key may be transmitted together with the encrypted content data file to the IC card 1500 by the cryptographic apparatus 1400, and stored in the data storage unit 1530 as an encrypting key file. Correspondingly, the cryptographic apparatus 1400, when implementing decryption, may obtain the encrypting key file from the IC card 1500, along with the media ID and generate a decryption key based on this information.

6. The error processing (step S826) in the fourth embodiment, performed during the sync verifying operation based on the sync verifying instruction, does not need to be performed by the sync detecting unit 2342. For example, an instruction specifying the substitution of or addition to the base address value may be inserted in the cryptographic information following the sync verifying information, and the processor 2341 may perform calculations based on this instruction.

7. In the embodiments, the content data and cryptographic information are stored on the same recording medium or transmitted together as multiplexed data. However, the content data and cryptographic information may reach the cryptographic apparatus via separate communication paths, provided that the cryptographic apparatus is able to recognize links between the two type of data and operate accordingly. In other words, the cryptographic apparatus may obtain information showing the links between the content data and the cryptographic information and, when performing cryptographic processing on a certain piece of content data, specify the cryptosystem to be used based on the cryptographic information corresponding to that particular content data. Note that if both the content data and cryptographic information are stored on the same recording medium or transmitted together as multiplexed data, the cryptographic apparatus can recognize corresponding data without needing to obtain separate link information, and so this construction is advantageous in that it removes the need to supply such information.

8. The procedure performed by the cryptographic apparatus in the embodiments (the processing shown in FIGS. 5, 8, 11, 12, 14 and 25 to 29) may be realized as a computer program distributed freely and circulated to subscribers to be executed by a general-purpose computer or similar. This is achieved by recording the computer program on a recording medium or transmitted by various types of communication path. The recording medium may be an IC card, an optical disk, a flexible disk, ROM or similar. The distributed computer program may be made available by being installed on a computer or similar device. The computer executes the program, realizing a cryptographic apparatus like the ones shown in the embodiments.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A cryptographic apparatus comprising:
a data reading means for reading content data and cryptographic information from a portable storage medium, the cryptographic information including information used to specify a certain part of the content data on which cryptographic processing is to be performed;
a part specifying means for specifying, based on the read cryptographic information, the certain part of the read content data at least by detecting a specific data section in the read content data; and
a cryptographic processing means for performing one of encryption and decryption on the certain part of the read content data, wherein
a plurality of pieces of content data are each recorded as a file on the storage medium, along with cryptographic information for each of a plurality of file types; and
the data reading means reads, from the storage medium, the content data of a file and the cryptographic information for a corresponding file type,
the cryptographic information includes a reference instruction indicating that a data section in the content data be referred to,
the part specifying means specifies the certain part by referring to the data section as indicated by the reference instruction,
the cryptographic information includes bit pattern information showing a certain bit sequence; and
the part specifying means detects, in the content data, bit data that matches the bit sequence shown in the bit pattern information, and uses a location of the bit data as a basis for specifying the certain part, the certain part having a fixed positional relationship to the bit data.

2. The cryptographic apparatus of claim 1, wherein:
the indicated data section shows a length of the certain part; and
the part specifying means specifies the certain part of the content data by referring to the data section as indicated by the reference instruction, and calculating the length of the certain part based on the referenced data section.

3. The cryptographic apparatus of claim 2, wherein:
the cryptographic information includes a value showing a unit used for the indicated data section; and
the part specifying means specifies the certain part by multiplying the length shown by the data section with the unit value to calculate the length of the certain part.

4. The cryptographic apparatus of claim 3, wherein:
the cryptographic information further includes a detect instruction for detecting, from the content data, bit data that matches the certain bit sequence shown by the bit pattern information, and specifies the order in which the reference and detect instructions are performed; and
the part specifying means specifies the certain part in the content data by performing, in the order specified by the cryptographic information, operations indicated by each of the instructions.

5. A cryptographic apparatus encrypting content data and recording the encrypted data onto a storage medium, the cryptographic apparatus comprising:
a content data obtaining means for obtaining content data;
a cryptographic information reading means for reading, from a portable storage medium, cryptographic information including information used to specify a certain part of the content data on which cryptographic processing is to be performed;
a part specifying means for specifying the certain part of the obtained content data based on the read cryptographic information at least by detecting a specific data section in the obtained content data;
a cryptographic processing means for encrypting the certain part; and
a content data recording means for recording the encrypted content data onto the storage medium, wherein
the cryptographic information includes bit pattern information showing a certain bit sequence; and
the part specifying means detects, in the content data, bit data that matches the bit sequence shown in the bit pattern information, and uses a location of the bit data as a basis for specifying the certain part, the certain part having a fixed positional relationship to the bit data.

6. The cryptographic apparatus of claim 5, wherein:
the cryptographic information includes a reference instruction indicating that a data section in the content data be referred to, the data section showing a length of the certain part; and
the part specifying means specifies the certain part by referring to the data section as indicated by the reference instruction and calculating the length of the certain part based on the referenced data section.

7. A cryptographic apparatus comprising:
a data obtaining means for obtaining, from received data, content data, and cryptographic information including information used to specify a certain part of the content data on which cryptographic processing is to be performed, the received data consisting of content data and cryptographic information that has been multiplexed and transmitted;
a part specifying means for specifying the certain part of the obtained content data based on the obtained cryptographic information at least by detecting a specific data section in the obtained content data; and
a cryptographic processing means for performing one of encryption and decryption on the certain part of the content data; wherein,
the cryptographic information includes a reference instruction indicating that a data section in the content data be referred to,
the part specifying means specifies the certain part by referring to the data section as indicated by the reference instruction,
the cryptographic information includes sync pattern information showing a certain bit sequence; and
the part specifying means detects, in the content data, a sync pattern corresponding to the bit sequence shown in the sync pattern information, and uses a location of the sync pattern as a basis for specifying the certain part, the certain part having a fixed positional relationship to the sync pattern.

8. The cryptographic apparatus of claim 7, wherein:
the part specifying means verifies the authenticity of the detected sync pattern by checking whether another sync pattern is located at a position a set interval away from the location of the detected sync pattern.

9. The cryptographic apparatus of claim 7, wherein:
the cryptographic information further includes flag pattern information showing a bit sequence, which is not the certain bit sequence shown by the sync pattern information, and position information specifying the position of the bit sequence; and
the part specifying means verifies whether the bit sequence shown by the flag pattern information exists at the position in the content data specified by the position information.

10. The cryptographic apparatus of claim 7, wherein:
the indicated data section shows a length of the certain part; and
the part specifying means specifies the certain part of the content data by referring to the data section as indicated by the reference instruction, and calculating the length of the certain part based on the referenced data section.

11. The cryptographic apparatus of claim 10, wherein:
the cryptographic information includes a value showing a unit used for the indicated data section; and
the part specifying means specifies the certain part by multiplying the length shown by the data section with the unit value to calculate the length of the certain part.

12. The cryptographic apparatus of claim 11, wherein:
the cryptographic information further includes a detect instruction for detecting, from the content data, bit data that matches the certain bit sequence shown by the bit pattern information, and specifies the order in which the reference and detect instructions are performed; and
the part specifying means specifies the certain part in the content data by performing, in the order specified by the cryptographic information, operations indicated by each of the instructions.

13. The cryptographic apparatus of claim 7,
the cryptographic information further includes at least one piece of algorithm information for specifying an algorithm used for cryptographic processing; and
the cryptographic processing means performs one of encryption and decryption on the certain part using the specified algorithm.

14. A cryptographic apparatus performing cryptographic processing on content data, the cryptographic apparatus comprising:
a content data obtaining means for obtaining content data;
a cryptographic information obtaining means for obtaining cryptographic information including information specifying a certain part on which cryptographic processing is to be performed in the contents data, the information including a reference instruction indicating that a data section in the content data be referred to;
a part specifying means for specifying the certain part of the content data based on the cryptographic information by detecting and referring to the data section in the content data as indicated by the reference instruction; and
a cryptographic processing means for performing one of encryption and decryption on the certain part, wherein
the cryptographic information includes bit pattern information showing a certain bit sequence; and
the part specifying means detects, in the content data, bit data that matches the bit sequence shown in the bit pattern information, and uses a location of the bit data as a basis for specifying the certain part, the certain part having a fixed positional relationship to the bit data.

15. The cryptographic apparatus of claim 14, wherein:
the cryptographic information includes a reference instruction indicating that a data section in the content data be referred to, the data section showing a length of the certain part; and
the part specifying means specifies the certain part by referring to the data section as indicated by the reference instruction and calculating the length of the certain part based on the referenced data section.

16. The cryptographic apparatus of claim 15, wherein:
the cryptographic information includes a value showing a unit used for the indicated data section; and
the part specifying means specifies the certain part by multiplying the length shown by the data section with the unit value to calculate the length of the certain part.

17. The cryptographic apparatus of claim 16, wherein:
the cryptographic information further includes a detect instruction for detecting, from the content data, bit data that matches the certain bit sequence shown by the bit pattern information, and specifies the order in which the reference and detect instructions are performed; and
the part specifying means specifies the certain part in the content data by performing, in the order specified by the cryptographic information, operations indicated by each of the instructions.

18. A program recording medium storing a control program for having a computer execute cryptographic processing on content data, the control program comprising:
a data reading step for reading content data and cryptographic information from a portable storage medium, the cryptographic information including information used to specify a certain part of the content data on which cryptographic processing is to be performed;
a part specifying step for specifying, based on the read cryptographic information, the certain part of the read content data at least by detecting a specific data section in the read content data; and
a cryptographic processing step for performing one of encryption and decryption on the certain part of the read content data, wherein
the cryptographic information includes bit pattern information showing a certain bit sequence; and
the part specifying step detects, in the content data, bit data that matches the bit sequence shown in the bit pattern information, and uses a location of the bit data as a basis for specifying the certain part, the certain part having a fixed positional relationship to the bit data.

19. A program recording medium storing a control program for having a computer storing content data execute cryptographic processing on the content data, the cryptographic processing (1) including encryption of the content data and recording of the encrypted content data onto a storage medium, and (2) comprising the following steps:
   a cryptographic information reading step for reading, from a portable storage medium, cryptographic information including information used to specify a certain part of the content data on which cryptographic processing is to be performed;
   a part specifying step for specifying the certain part of the content data based on the read cryptographic information at least by detecting a specific data section in the content data;
   a cryptographic processing step for encrypting the certain part; and
   a content data recording step for recording the encrypted content data onto the other storage medium, wherein
   the cryptographic information includes bit pattern information showing a certain bit sequence; and
   the part specifying step detects, in the content data, bit data that matches the bit sequence shown in the bit pattern information, and uses a location of the bit data as a basis for specifying the certain part, the certain part having a fixed positional relationship to the bit data.

20. A program recording medium storing a control program for having a computer execute cryptographic processing on content data, the cryptographic processing comprising:
   a data obtaining step for obtaining, from received data, content data, and cryptographic information including information used to specify a certain part of the content data on which cryptographic processing is to be performed, the received data consisting of content data and cryptographic information that has been multiplexed and transmitted;
   a part specifying step for specifying the certain part of the obtained content data based on the obtained cryptographic information at least by detecting a specific data section in the obtained content data; and
   a cryptographic processing step for performing one of encryption and decryption on the certain part of the content data, wherein
   the cryptographic information includes sync pattern information showing a certain bit sequence; and
   the part specifying step detects, in the content data, a sync pattern corresponding to the bit sequence shown in the sync pattern information, and uses a location of the sync pattern as a basis for specifying the certain part, the certain part having a fixed positional relationship to the sync pattern.

21. The program recording medium of claim 20, wherein: the part specifying step verifies the authenticity of the detected sync pattern by checking whether another sync pattern is located at a position a set interval away from the location of the detected sync pattern.

22. A program recording medium storing a control program for having a computer execute cryptographic processing on content data, the cryptographic processing comprising:
   a content data obtaining step for obtaining content data;
   a cryptographic information obtaining step for obtaining cryptographic information including information specifying a certain part on which cryptographic processing is to be performed in the contents data, the information including a reference instruction indicating that a data section in the content data be referred to;
   a part specifying step for specifying the certain part of the content data based on the cryptographic information by detecting and referring to the data section in the content data as indicated by the reference instruction; and
   a cryptographic processing step for performing one of encryption and decryption on the certain part, wherein
   the cryptographic information includes bit pattern information showing a certain bit sequence; and
   the part specifying step detects, in the content data, bit data that matches the bit sequence shown in the bit pattern information, and uses a location of the bit data as a basis for specifying the certain part, the certain part having a fixed positional relationship to the bit data.

23. The program recording medium of claim 22, wherein:
   the indicated data section shows a length of the certain part; and
   the part specifying step specifies the certain part of the content data by referring to the data section as indicated by the reference instruction, and calculating the length of the certain part based on the referenced data section.

24. A portable data recording medium storing encrypted content data, the data recording medium comprising:
   a content data recording area in which content data, of which a certain part has been encrypted, is recorded; and
   a cryptographic information recording area in which cryptographic information, including information used to specify the certain part of the content data by detecting a specific data section in the content data, is recorded, wherein
   each of a plurality of pieces of encrypted content data is recorded as a file in the content data recording area; and
   cryptographic information is recorded in the cryptographic information recording area according to file type,
   the cryptographic information includes a reference instruction instructing a decrypting apparatus decrypting the content data to refer to a data section in the content data, and
   the cryptographic information includes bit pattern information showing a certain bit sequence, and information instructing the decrypting apparatus to detect, in the content data, bit data matching the certain bit sequence and use a location of the bit data as a basis for specifying the certain part, the certain part having a fixed positional relationship to the bit data.

25. The data recording medium of claim 24, wherein the indicated data section shows a length of the certain part; and
   the part specifying step specifies the certain part of the content data by referring to the data section as indicated by the reference instruction, and calculating the length of the certain part based on the referenced data section.

26. A portable data recording medium storing encrypted content data, the data recording medium comprising:
   a content data recording area in which content data, of which a certain part has been encrypted, is recorded; and
   a cryptographic information recording area in which cryptographic information, including information used to specify the certain part of the content data by detecting a specific data section in the content data, is recorded, wherein the cryptographic information includes a reference instruction indicating to a decryption apparatus decrypting the content data that a data section in the content data be referred to, the cryptographic information includes bit pattern information showing a certain bit sequence, and the cryptographic information further includes a detect instruction for detecting, from the content data, bit data that matches the certain bit sequence shown by the bit pattern information, and specifies the order in which the decryption apparatus performs operations indicated by the reference instruction and the detect instruction.

27. A cryptographic apparatus comprising:

a data reading means for reading content data and cryptographic information from a portable storage medium, the cryptographic information including information used to specify a certain part of the content data on which cryptographic processing is to be performed;

a part specifying means for specifying, based on the read cryptographic information, the certain part of the read content data; and a cryptographic processing means for performing one of encryption and decryption on the certain part of the read content data, wherein:

the cryptographic information further includes a plurality of pieces of algorithm information for specifying an algorithm used for cryptographic processing, pieces of range information each showing a range over which an algorithm is applied, and information showing priority ratings indicating an order in which the pieces of algorithm information should be applied;

the cryptographic processing means selects, for each application range in the certain part, a piece of algorithm information based on the range information, and uses an algorithm specified by the piece of algorithm information to perform one of encryption and decryption on the application range; and when the application ranges of a plurality of algorithms overlap, the cryptographic processing means selects pieces of algorithm information according to the priority ratings.

28. A cryptographic apparatus encrypting content data and recording the encrypted data onto a storage medium, the cryptographic apparatus comprising:

a content data obtaining means for obtaining content data;

a cryptographic information reading means for reading, from a portable storage medium, cryptographic information including information used to specify a certain part of the content data on which cryptographic processing is to be performed;

a part specifying means for specifying the certain part of the obtained content data based on the read cryptographic information;

a cryptographic processing means for encrypting the certain part; and a content data recording means for recording the encrypted content data onto the storage medium, wherein:

the cryptographic information further includes a plurality of pieces of algorithm information for specifying an algorithm used for cryptographic processing, pieces of range information each showing a range in the content data over which an algorithm is applied, and information showing priority ratings indicating an order in which the pieces of algorithm information should be applied;

the cryptographic processing means selects, for each application range in the certain part, a piece of algorithm information based on the range information, and uses an algorithm specified by the piece of algorithm information to encrypt data in the application range; and when the application ranges of a plurality of algorithms overlap, the cryptographic processing means selects pieces of algorithm information according to the priority ratings.

29. A cryptographic apparatus comprising:

a data obtaining means for obtaining, from received data, content data, and cryptographic information including information used to specify a certain part of the content data on which cryptographic processing is to be performed, the received data consisting of content data and cryptographic information that has been multiplexed and transmitted;

a part specifying means for specifying the certain part of the obtained content data based on the obtained cryptographic information; and a cryptographic processing means for performing one of encryption and decryption on the certain part of the content data, wherein:

the cryptographic information further includes a plurality of pieces of algorithm information for specifying an algorithm used for cryptographic processing, pieces of range information each showing a range over which an algorithm is applied, and information showing priority ratings indicating an order in which the pieces of algorithm information should be applied;

the cryptographic processing means selects, for each application range in the certain part, a piece of algorithm information based on the range information, and uses an algorithm specified by the piece of algorithm information to perform one of encryption and decryption on the application range; and when the application ranges of a plurality of algorithms overlap, the cryptographic processing means selects pieces of algorithm information according to the priority ratings.

30. A cryptographic apparatus performing cryptographic processing on content data, the cryptographic apparatus comprising:

a content data obtaining means for obtaining content data;

a cryptographic information obtaining means for obtaining cryptographic information including information specifying a certain part on which cryptographic processing is to be performed in the contents data, the information including a reference instruction indicating that a data section in the content data be referred to;

a part specifying means for specifying the certain part of the content data based on the cryptographic information by referring to the data section in the content data as indicated by the reference instruction; and a cryptographic processing means for performing one of encryption and decryption on the certain part, wherein:

the cryptographic information further includes a plurality of pieces of algorithm information for specifying an algorithm used for cryptographic processing, pieces of range information each showing a range over which an algorithm is applied, and information showing priority ratings indicating an order in which the pieces of algorithm information should be applied;

the cryptographic processing means selects, for each application range in the certain part, a piece of algorithm information based on the range information, and uses an algorithm specified by the piece of algorithm information to perform one of encryption and decryption on the application range; and when the application ranges of a plurality of algorithms overlap, the cryptographic processing means selects pieces of algorithm information according to the priority ratings.

31. A portable data recording medium storing encrypted content data, the data recording medium comprising:

a content data recording area in which content data, of which a certain part has been encrypted, is recorded; and a cryptographic information recording area in which cryptographic information, including information used to specify the certain part of the content data, is recorded, wherein:

the cryptographic information further includes a plurality of pieces of algorithm information for specifying an algorithm to be used when decrypting the content data, pieces of range information showing the application range of each piece of algorithm information, and priority ratings used to determine which algorithm information should be applied when the application ranges of a plurality of pieces of algorithm information overlap.

* * * * *